United States Patent
Nollet et al.

(10) Patent No.: US 8,020,163 B2
(45) Date of Patent: Sep. 13, 2011

(54) HETEROGENEOUS MULTIPROCESSOR NETWORK ON CHIP DEVICES, METHODS AND OPERATING SYSTEMS FOR CONTROL THEREOF

(75) Inventors: Vincent Nollet, Mechelen (BE); Paul Coene, Grobbendonk (BE); Theodore Marescaux, Leuven (BE); Prabhat Avasare, Mumbai (IN); Jean-Yves Mignolet, Berloz (BE); Serge Vernalde, Leuven (BE); Diederik Verkest, Lubbeek (BE)

(73) Assignees: Interuniversitair Microelektronica Centrum (IMEC), Leuven (BE); Xilinx, Inc., San Jose, CA (US)

( * ) Notice: Subject to any disclaimer, the term of this patent is extended or adjusted under 35 U.S.C. 154(b) by 1807 days.

(21) Appl. No.: 10/997,811

(22) Filed: Nov. 24, 2004

(65) Prior Publication Data

US 2005/0203988 A1 Sep. 15, 2005

Related U.S. Application Data

(63) Continuation-in-part of application No. 10/453,899, filed on Jun. 2, 2003, now abandoned.

(60) Provisional application No. 60/524,768, filed on Nov. 25, 2003, provisional application No. 60/569,204, filed on May 7, 2004.

(51) Int. Cl.
*G06F 9/46* (2006.01)
*G06F 15/16* (2006.01)
*H04L 12/28* (2006.01)

(52) U.S. Cl. ......... 718/104; 718/100; 709/200; 370/400

(58) Field of Classification Search .................. 718/100, 718/104; 709/200
See application file for complete search history.

(56) References Cited

U.S. PATENT DOCUMENTS

| | | | | |
|---|---|---|---|---|
| 6,601,126 B1* | 7/2003 | Zaidi et al. | ..................... | 710/305 |
| 6,768,742 B1* | 7/2004 | Godfrey | ........................ | 370/400 |
| 6,947,433 B2* | 9/2005 | Carvey | .......................... | 370/401 |
| 2003/0208552 A1* | 11/2003 | Karlsson et al. | ............. | 709/213 |
| 2004/0078462 A1* | 4/2004 | Philbrick et al. | ............. | 709/224 |
| 2004/0128341 A1* | 7/2004 | Synek et al. | .................. | 709/200 |
| 2005/0021871 A1* | 1/2005 | Georgiou et al. | ............. | 709/250 |

OTHER PUBLICATIONS

Benini, et al., "Networks on Chips: A new SOC paradigm", IEEE Computer magazine, pp. 70-78, (Jan. 2002).

(Continued)

*Primary Examiner* — Kenneth Tang
(74) *Attorney, Agent, or Firm* — Knobbe Martens Olson & Bear LLP

(57) ABSTRACT

Network on Chip (NoC) Devices, especially Heterogeneous Multiprocessor Network on Chip Devices are described, that optionally contain Reconfigurable Hardware Tiles, as well as Methods and Operating Systems (OS) for Control thereof. In accordance with an aspect of the present invention the Operating Systems handle either (a) run-time traffic management methods or (b) task migration methods, or a combination of these methods. The Operating Systems may be partly distributed but with a centralized master. The traffic management methods and apparatus of the invention use a statistical QoS approach. A system is described having an at least dual Network on Chip as well as methods of operating the same. The system has at least an on-chip communications network, comprising a first on-chip data traffic network (data NoC) and a second on-chip control traffic network (control NoC), having a control network interface component (control NIC) and a data network interface component (data NIC).

26 Claims, 19 Drawing Sheets

OTHER PUBLICATIONS

Bungale, et al., "An Approach to Heterogeneous Process State Capture / Recovery, to Achieve Minimum Performance Overhead During Normal Execution", Proceedings of the 12th International Heterogeneous Computing Workshop (HCW 2003)—held as part of the 17th International Parallel and Distributed Processing Symposium (IPDPS 2003), pp. 1-6, Nice, France, (Apr. 22, 2003).

Dally, et al., "Route Packets, Not Wires: On-Chip Interconnection Networks", in Proceedings of 38th Design Automation Conference (DAC), pp. 684-689, Las Vegas, (Jun. 2001).

Denolf, et al., "Cost-efficient C-Level Design of an MPEG-4 Video Decoder", International Workshop on Power and Timing Modeling, Optimization and Simulation, pp. 1-10, Goettingen, Germany, (Sep. 13-15, 2000).

Dielissen, et al., "Concepts and Implementation of the Philips Network-on-Chip", IP/SoC, pp. 1-6, (2003).

Ferrari, et al., "Process Introspection: A Heterogeneous Checkpoint/Restart Mechanism Based on Automatic Code Modification", Technical Report CS-97-05, Department of Computer Science, University of Virginia, pp. 1-16, (Mar. 25, 1997).

Guerrier, et al. "A Generic Architecture for On-Chip Packet-Switched Interconnections", Université Pierre et Marie Curie, pp. 250-256, (2000).

Haubelt, et al., "Basic OS support for distributed reconfigurable hardware", In the Proceedings of the Third International Workshop on systems, Architectures, Modeling, and Simulation (SAMOS '03), pp. 18-23, Samos, Greece, (Jul. 21-23, 2003).

Hu, et al., "Energy-Aware Communication and Task Scheduling for Network-on-Chip Architectures under Real-Time Constraints", Proceedings of the Design, Automation and Test in Europe Conference and Exhibition, pp. 234-239, (2004).

Jantsch, "Will Networks on Chip Close the Productivity Gap?", Networks on Chip, Kluwer Academic Publishers, Dordrecht, The Netherlands, pp. 3-18, (2003).

Jiang, et al. "Compile/run-time support for thread migration", Proceedings of the International Parallel and Distributed Processing Symposium (IPDPS), pp. 58-66, (Apr. 2002).

Jin, et al., "Classification and Comparison of QoS Specification Languages for Distributed Multimedia Applications", University of Illinois at Urbana-Champaign, pp. 1-12, (2002).

Kim et al., "Dynamic Mapping in a Heterogeneous Environment with Tasks Having Priorities and Multiple Deadlines.", Proc. 17th International Parallel and Distributed Processing Symposium, pp. 1-15, (2003).

Kumar, et al., "A network on chip architecture and design methodology," in Proceedings of the IEEE Computer Society Annual Symposium on VLSI, pp. 1-8, (Apr. 2002).

Kumar, "On packet switched networks for on-chip communication" in A. Jantsch and H. Tenhunen, editors, Networks on Chip, chapter 5, pp. 85-106. Kluwer Academic Publishers, Netherlands, (Feb. 2003).

Marescaux, et al., "Interconnection Networks Enable Fine-Grain Dynamic Multi-Tasking on FPGAs", Proc. 12th Int. Conf. on Field-Programmable Logic and Applications, Springer LNCS 2438, pp. 795-805, Montpellier, (Sep. 2002).

Marescaux, et al., "Networks on chip as hardware components of an OS for reconfigurable systems", pp. 595-605, (2003).

Mignolet, et al., "Infrastructure for Design and Management of Relocatable Tasks in a Heterogeneous Reconfigurable System-on-Chip", Proceedings of the Design, Automation and Test in Europe Conference and Exhibition, pp. 986-992, Munich, (Mar. 2003).

Nollet, et al., "Designing an Operating System for a Heterogeneous Reconfigurable SoC", Proceeding of the International Parallel and Distributed Processing Symposium, Nice, pp. 1-8, (Apr. 2003).

Radulescu, et al., "Communication Services for Networks on Chip", SAMOS, II( ), pp. 275-299, Samos, Greece, (Jul. 2002).

Rijpkema, et al., "Trade Offs in the Design of a Router with Both Guaranteed and Best-Effort Services for Networks on Chip", Proceedings of the Design, Automation and Test in Europe Conference and Exhibition, pp. 1-6, Munich, (2003).

Russ, "Dynamic Communication Mechanism Switching in Hector", Mississippi State Technical Report No. MSSU-EIRS-ERC-97-8 Mississippi State University/National Science Foundation, Engineering Research Center for Computational Field Simulation, pp. 1-10, (Sep. 1997).

Russ, et al., "Hector: An agent-based architecture for dynamic resource management", IEEE, pp. 47-55, (Apr.-Jun. 1999).

Simmler, et al., "Multitasking on FPGA Coprocessors", Proceedings 10 Int'l Conf. Field Programmable Logic and Applications, pp. 121-130, Aug. 2000).

Singhal, et al. "Multiprocessor Operating Systems", Advanced Concepts in Operating Systems: Distributed, Database and Multiprocessor Operating Systems, McGraw-Hill Series in Computer Science, McGraw-Hill, New York, pp. 444-445, (1994).

Smith, "Heterogeneous Process Migration: The Tui System", Software, Practice and Experience, Univ. of British Columbia, 28(6), pp. 1-32, (Feb. 28, 1996).

Steketee, et al., "Implementation of Process Migration in Amoeba", Proceedings of the 14th Conference on Distributed Computing Systems, pp. 194-201, Poland, (Jun. 1994).

Stellner, "CoCheck: Checkpointing and Process Migration for MPI", Proceedings of the 10th International Parallel Processing Symposium, pp. 526-531, Honolulu HI, (Apr. 1996).

Stellner, "Consistent Checkpoints of PVM Applications", Proceedings of the First European PVM Users Group Meeting, Rome, pp. 1-8, (1994).

Tessier, et al., "Reconfigurable Computing for Digital Signal Processing: A Survey", Journal of VLSI Signal Processing 28, pp. 7-27, (2001).

Wiseman, et al., "Paired Gang Scheduling", IEEE Transactions on Parallel and Distributed Systems, vol. 14, No. 6, pp. 581-592, (Jun. 2003).

Partial European Search Report for European Application No. EP 04 44 7261, dated Mar. 31, 2005.

* cited by examiner

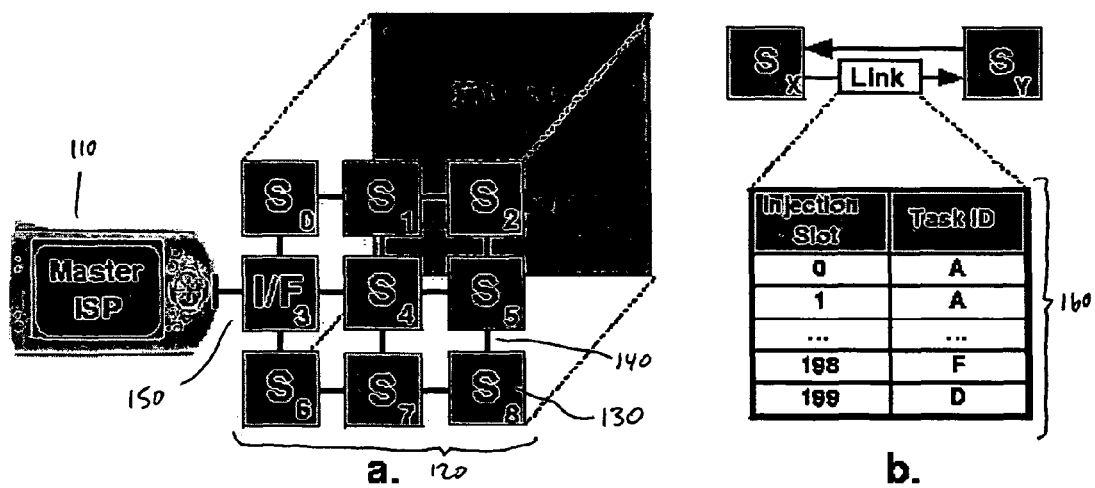
Figure 1:(a) Our NoC emulation platform. (b) Communication resource management
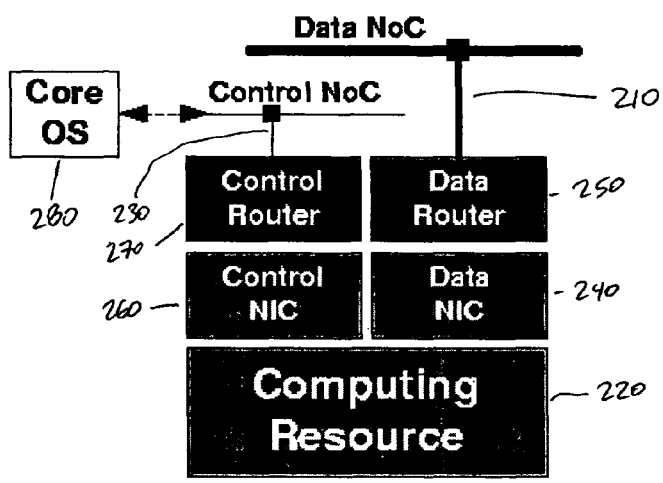
Figure 2 a. b.

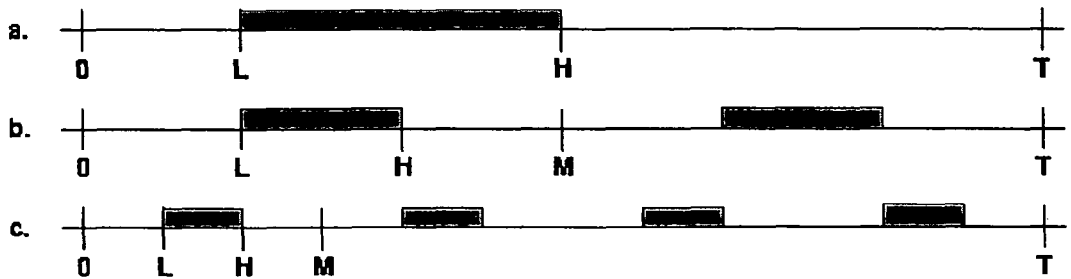
Figure 5: The size and location of 'send window' is specified by a low value (L), a high value (H) and a modulo value (M).
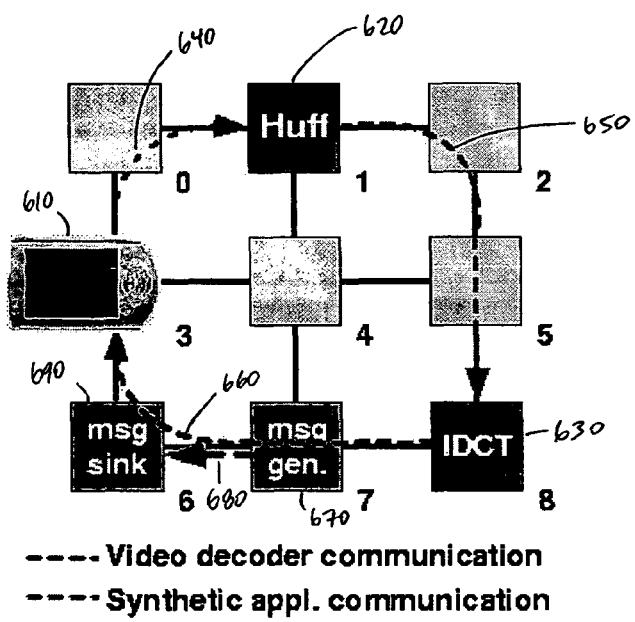
- - - - Video decoder communication
- - - - Synthetic appl. communication
Figure 6

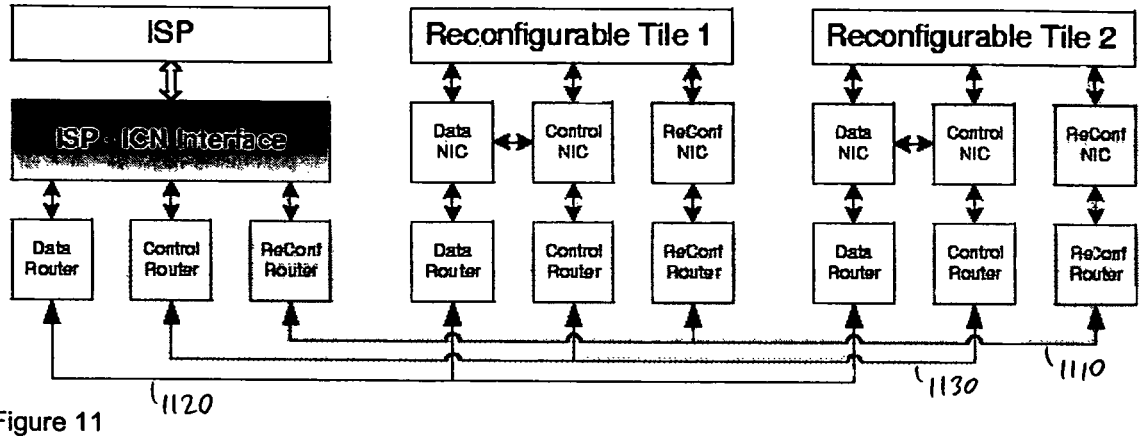
Figure 11
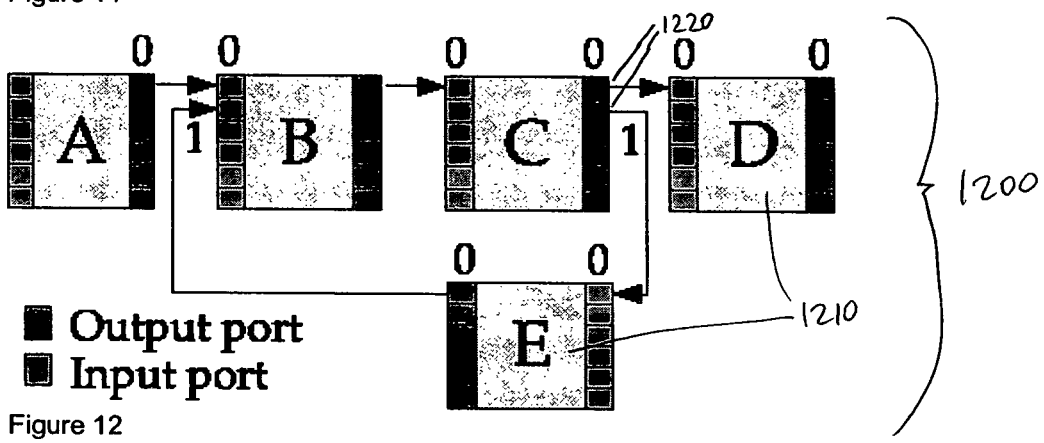
■ Output port
▣ Input port
Figure 12
| Task | src_out_port | dst_in_port | dst_logic_addr | dst_phys_addr |
|---|---|---|---|---|
| A | 0 | 0 | logic(B) | physical(B) |
| B | 0 | 0 | logic(C) | physical(C) |
| C | 0 | 0 | logic(D) | physical(D) |
| C | 1 | 0 | logic(E) | physical(E) |
| D | {∅} | {∅} | {∅} | {∅} |
| E | 0 | 1 | logic(B) | physical(B) |
Figure 13

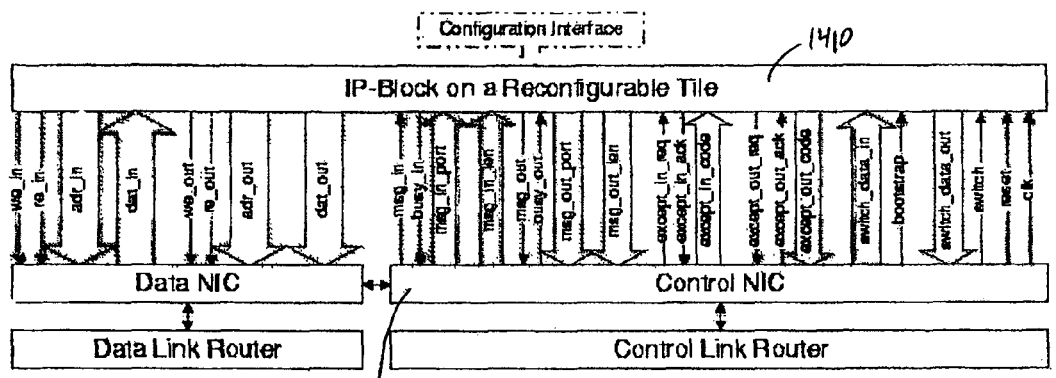
Figure 14
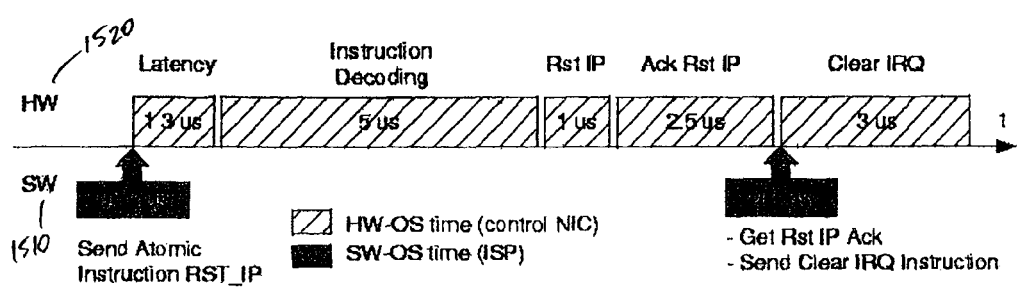
Figure 15
Figure 26B

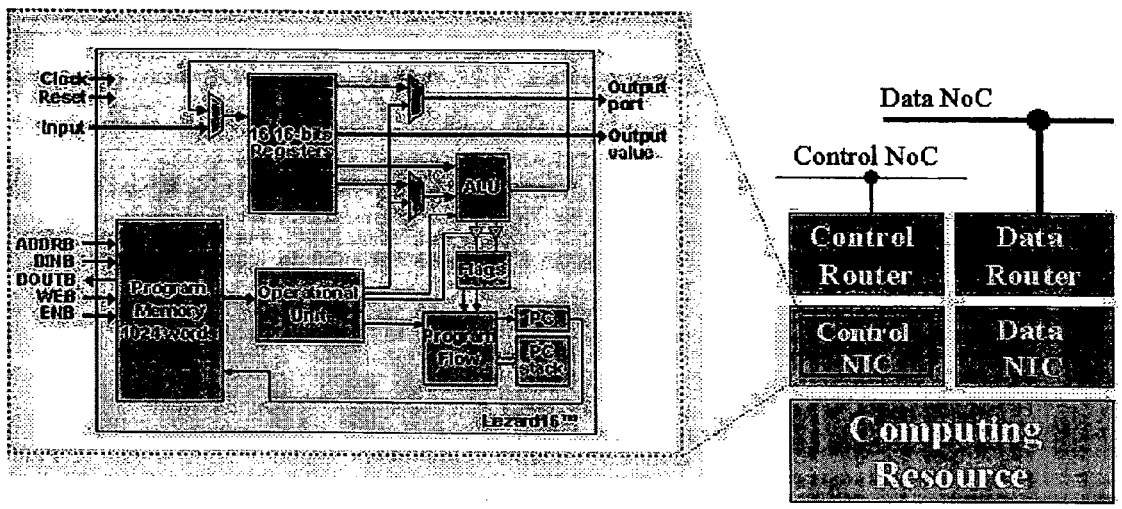
*Figure 16*
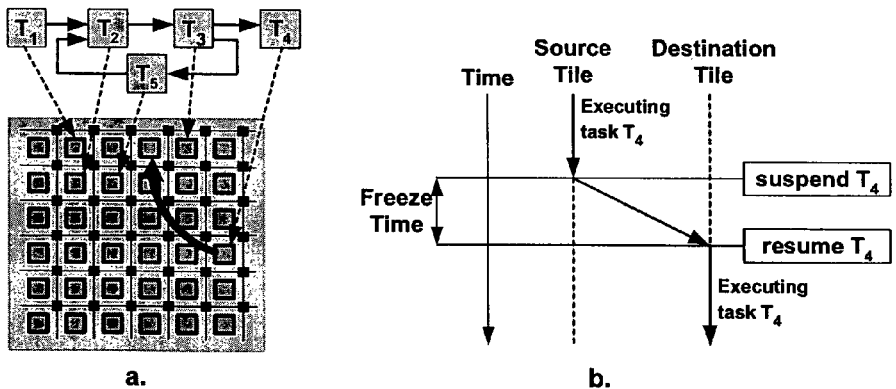
Figure 17: (a) Tasks are mapped onto the tile-based architecture. In order to optimize a certain parameter, task $T_4$ is migrated from its original tile to a destination tile. (b) A more detailed view of the migration mechanism employed to migrate $T_4$.

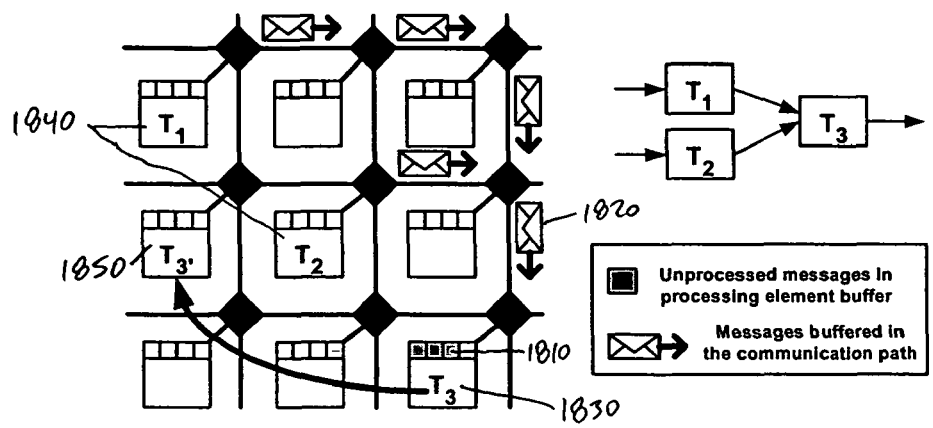
Figure 18: Migration of task $T_3$ leaves a number of unprocessed messages in the communication input buffer of the source tile. In addition, there might still be a number of messages buffered in the communication path between $T_3$ and $T_1/T_2$

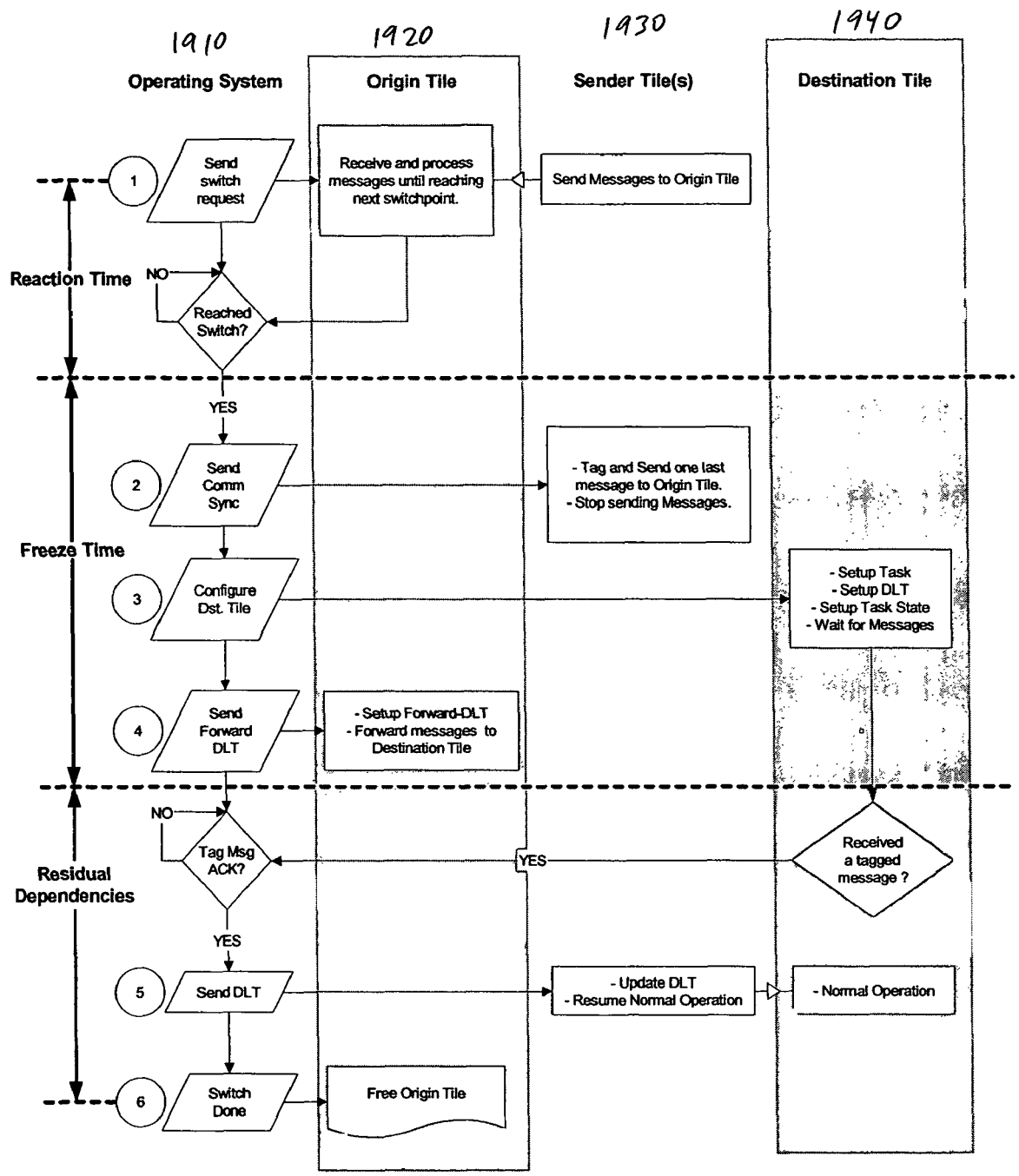
Figure 19: Different steps of the general NoC task migration mechanism

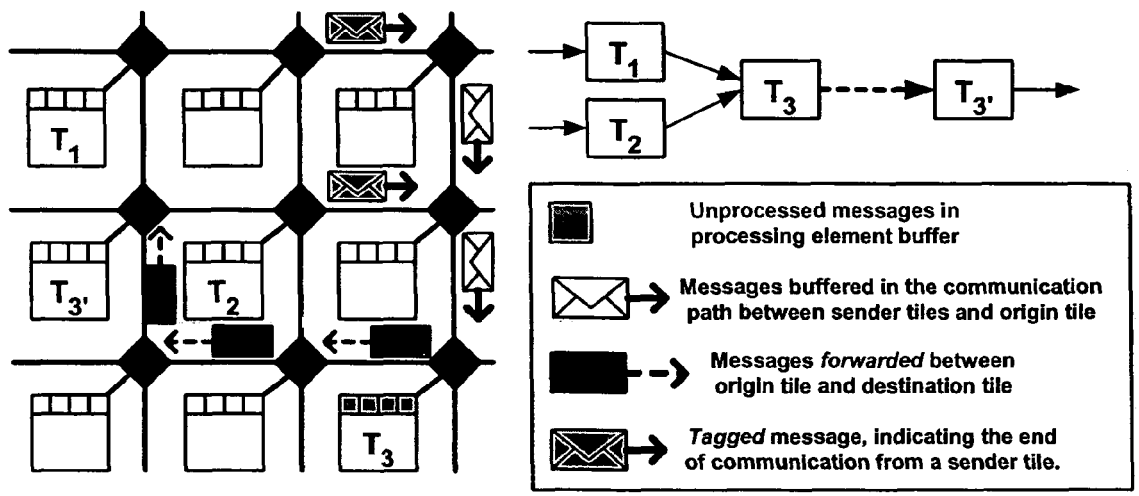
Figure 20: Forwarding buffered and unprocessed message to the destination tile. All last messages coming from the sender tiles are tagged.
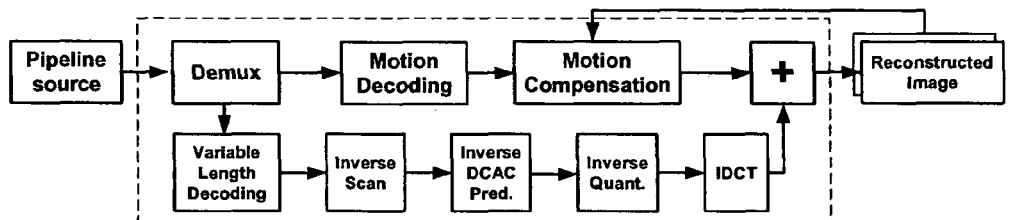
Figure 21: MPEG-4 simple profile decoding pipeline
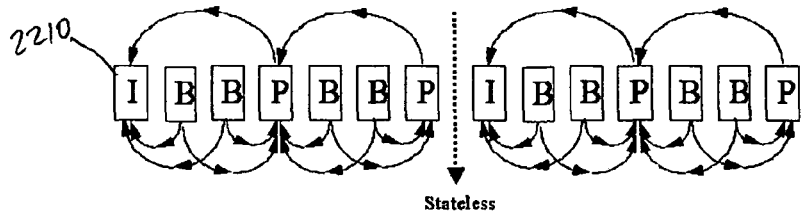
Figure 22: Typical dependencies between frames in an MPEG stream. Both series (before and after the stateless point) could be processed by a separate decoding pipeline.

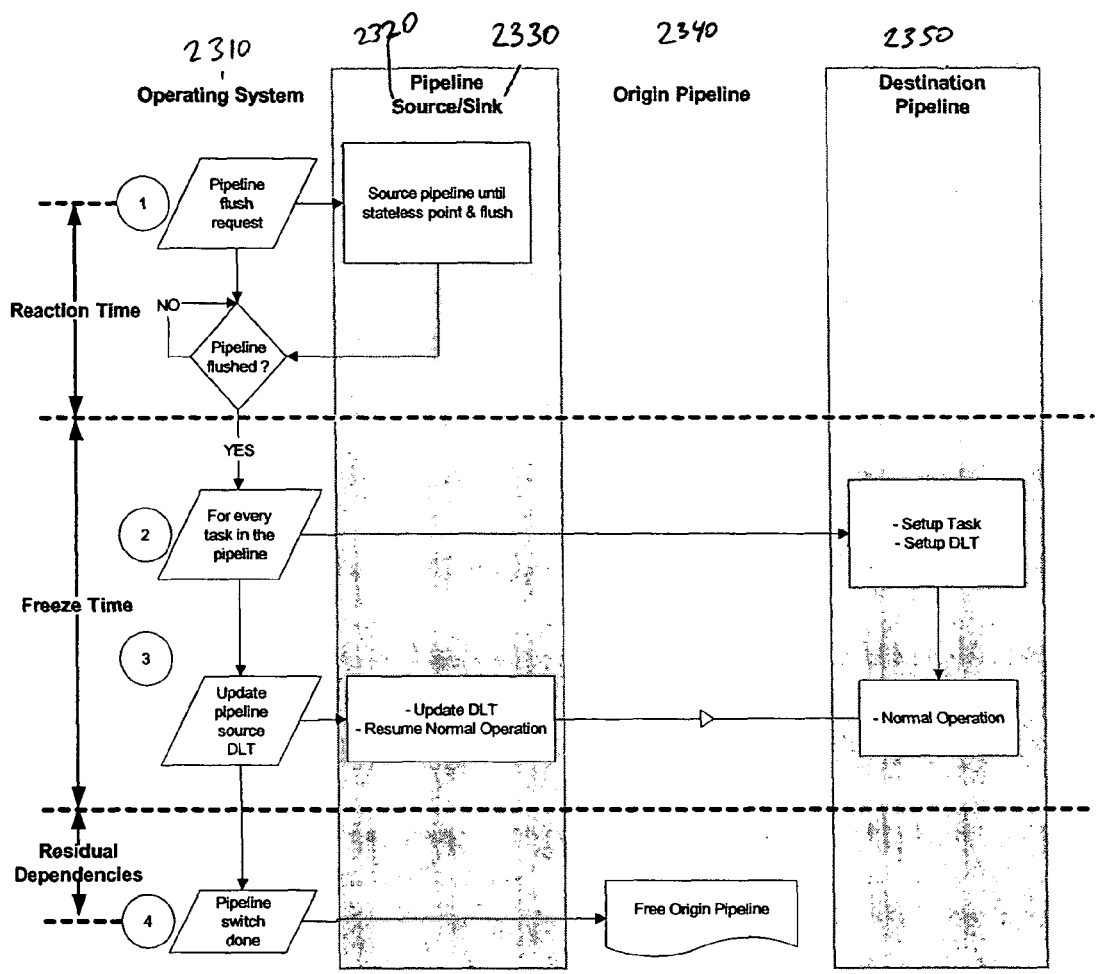
Figure 23: Different steps of the pipeline migration mechanism.
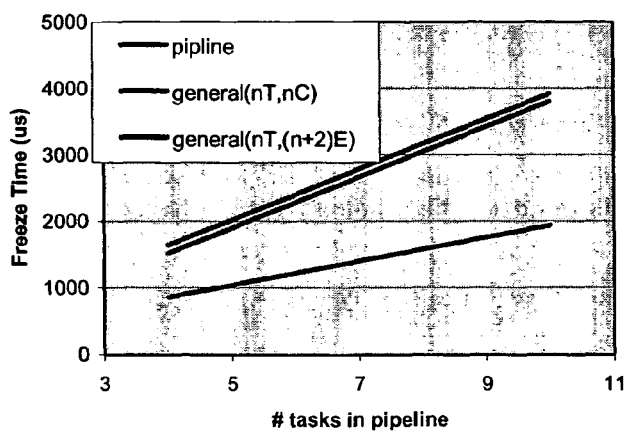
Figure 24: Comparison of freeze time between the general and the pipeline migration mechanism when migrating a pipeline.

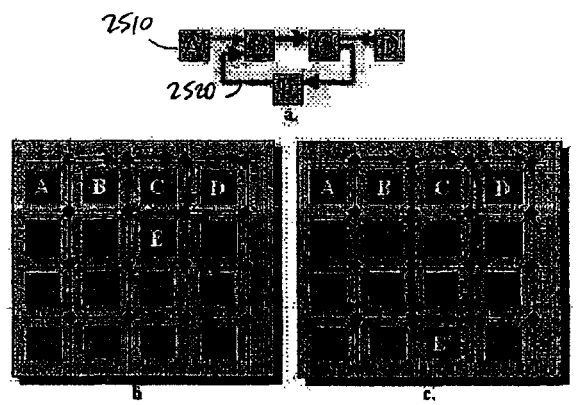
Figure 25: Moving a task of a closely integrated application (a) can increase usage of communication resources, increase interference with other applications and ultimately affect the application itself.
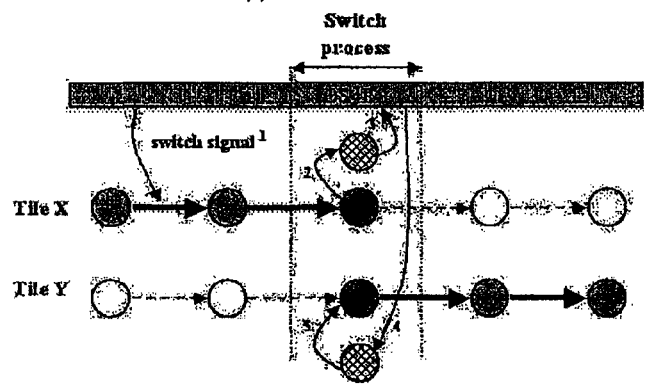
Figure 26A: Capturing and transferring task state when migrating a task at run-time from computing resource (tile) X to computing resource (tile) Y

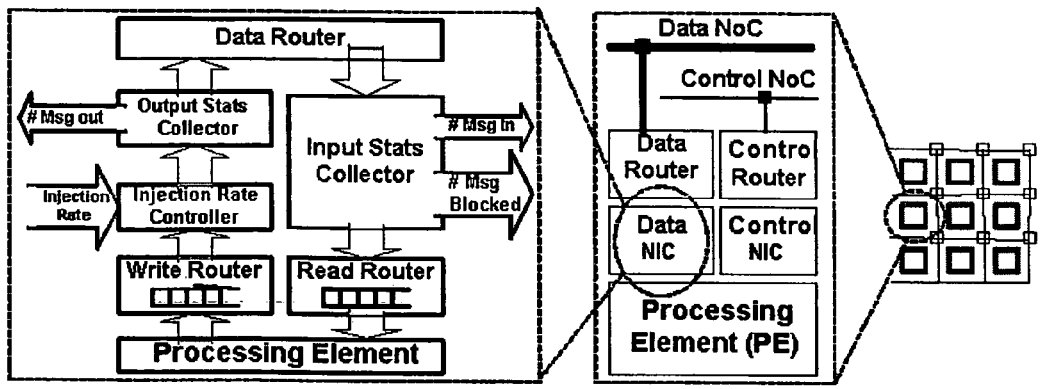
Figure 27: The data NIC collects communication statistics for the control NIC. The control NIC specifies the injection window to be enforced by the data NIC.
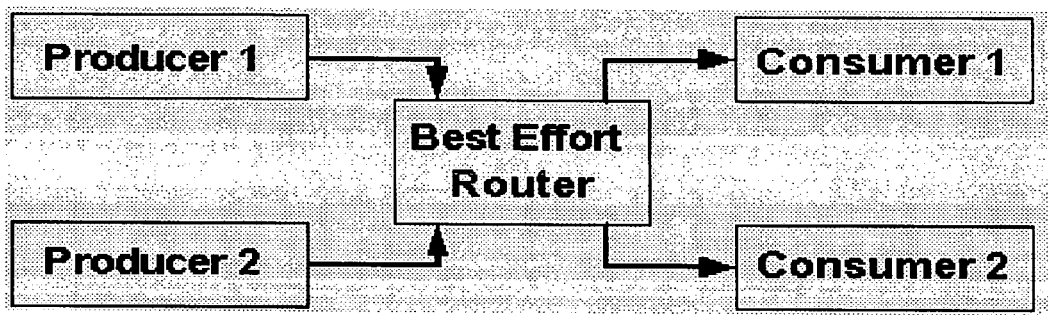
Figure 28. Setup simulation model
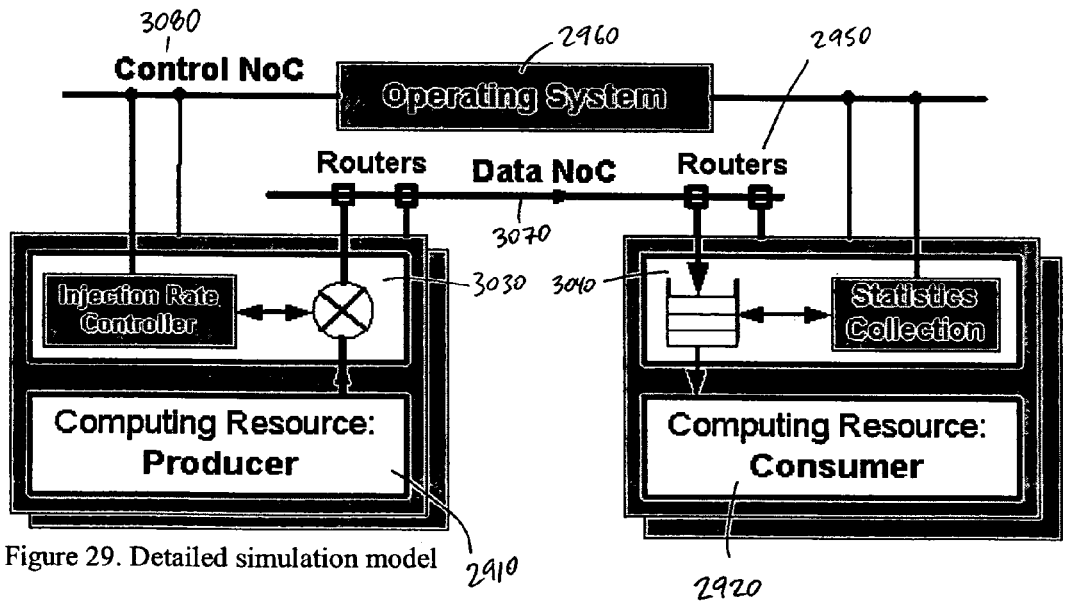
Figure 29. Detailed simulation model

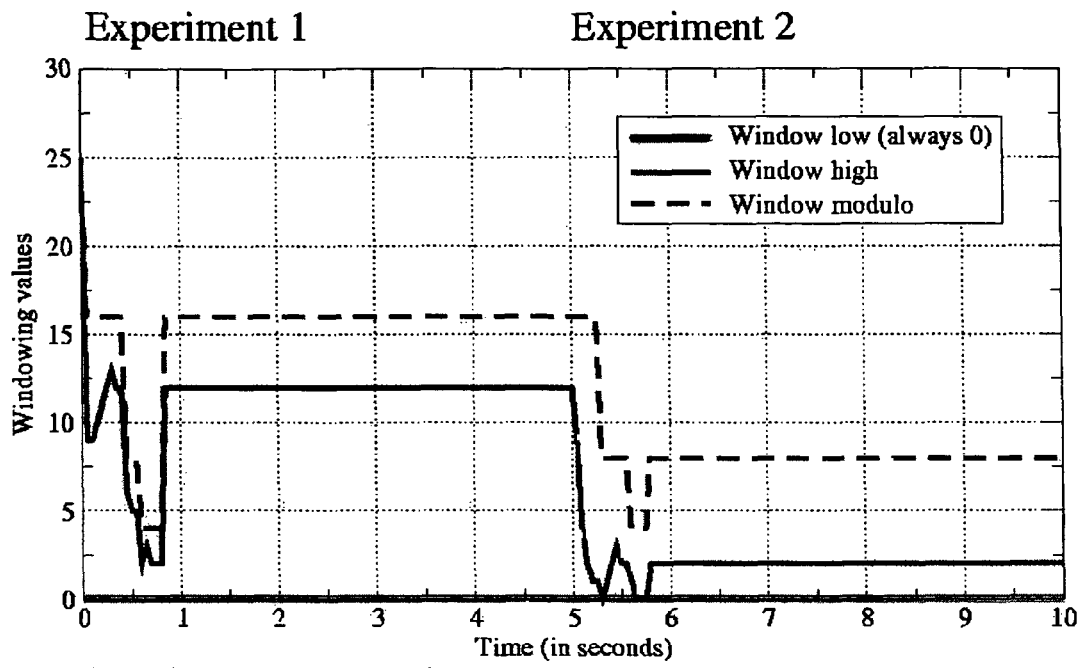
Figure 30. Finding optimum *send window* values
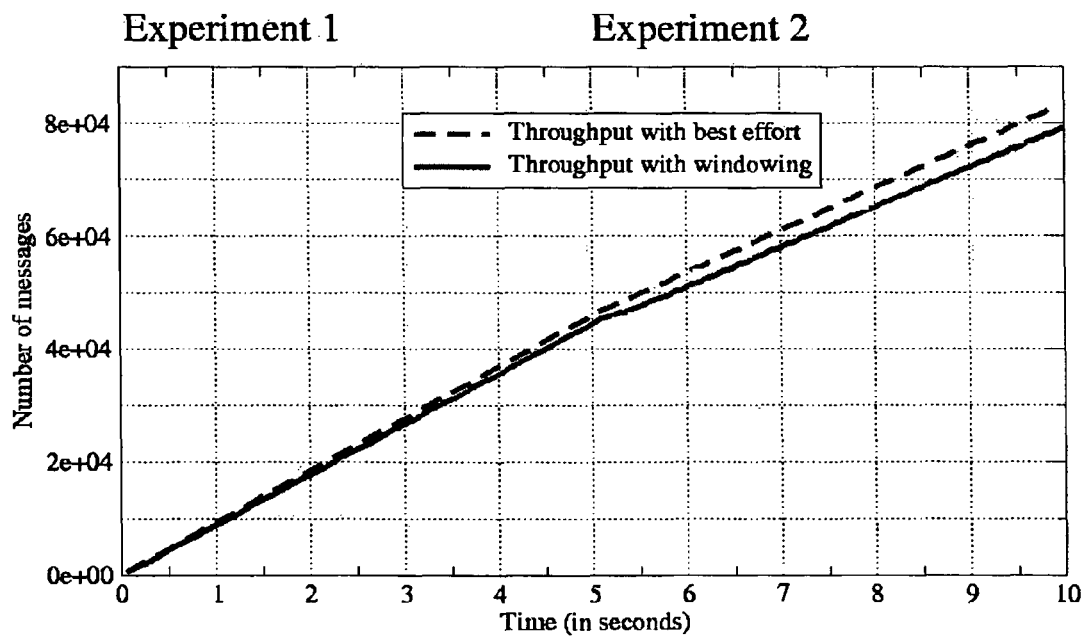
Figure 31. NoC throughput comparison with and without OS communication management.

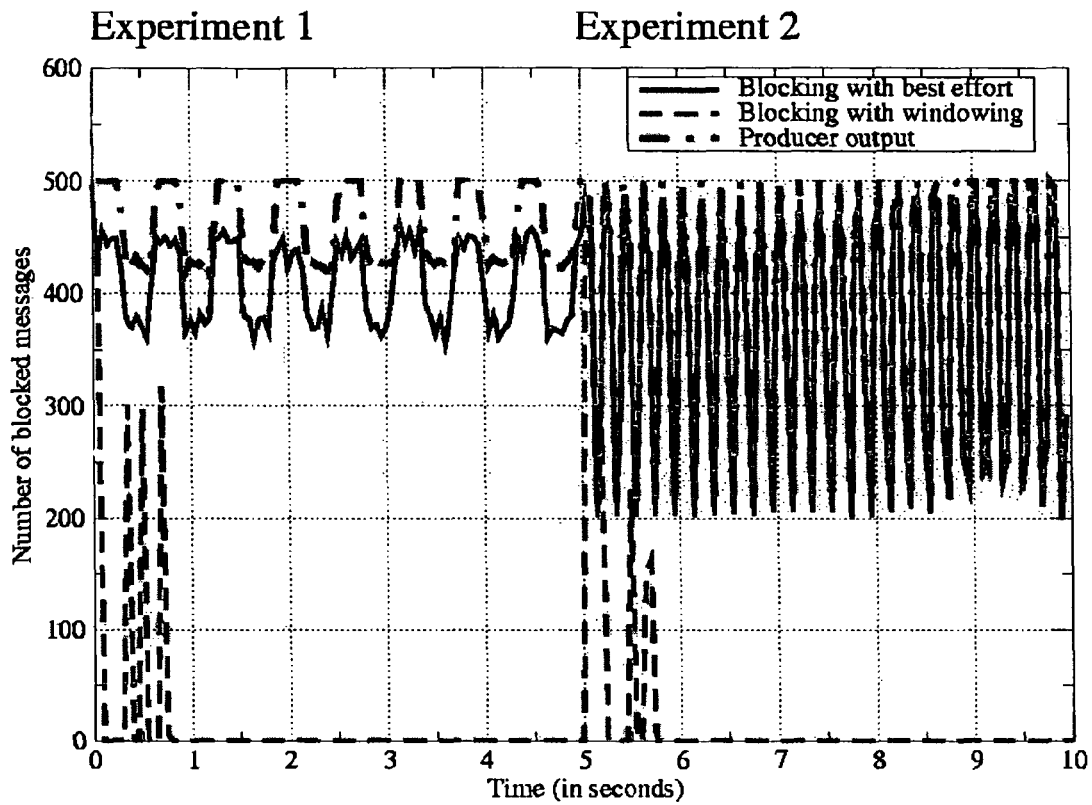
Figure 32. NoC blocking comparison with and without OS communication management.
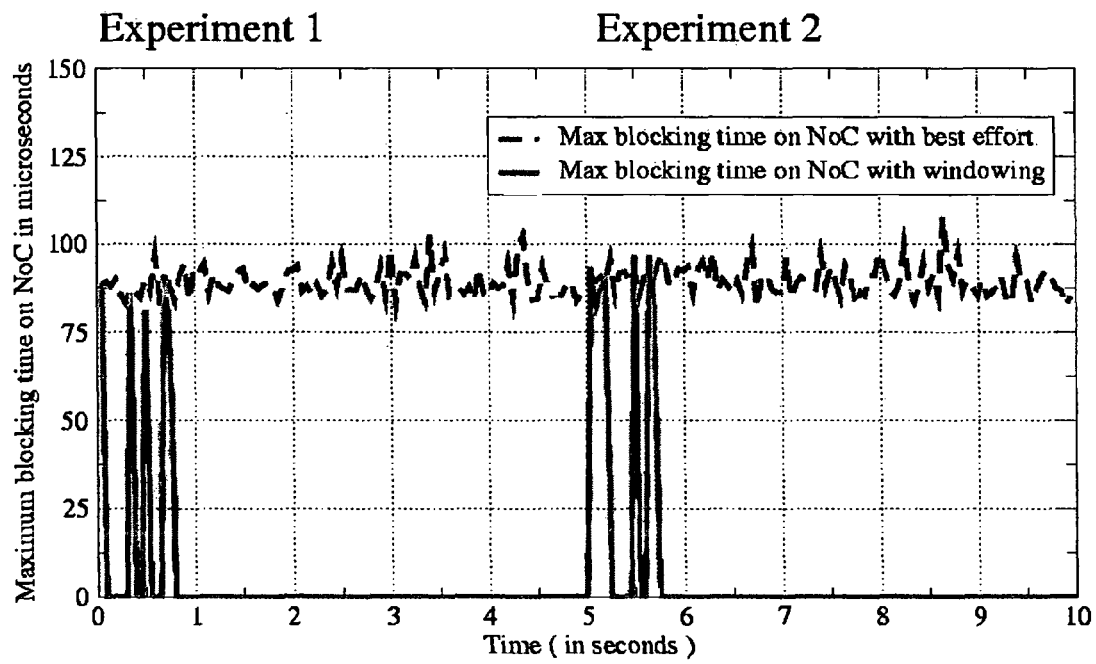
Figure 33. Comparison of maximum blocking times for the NoC communication with and without OS management.

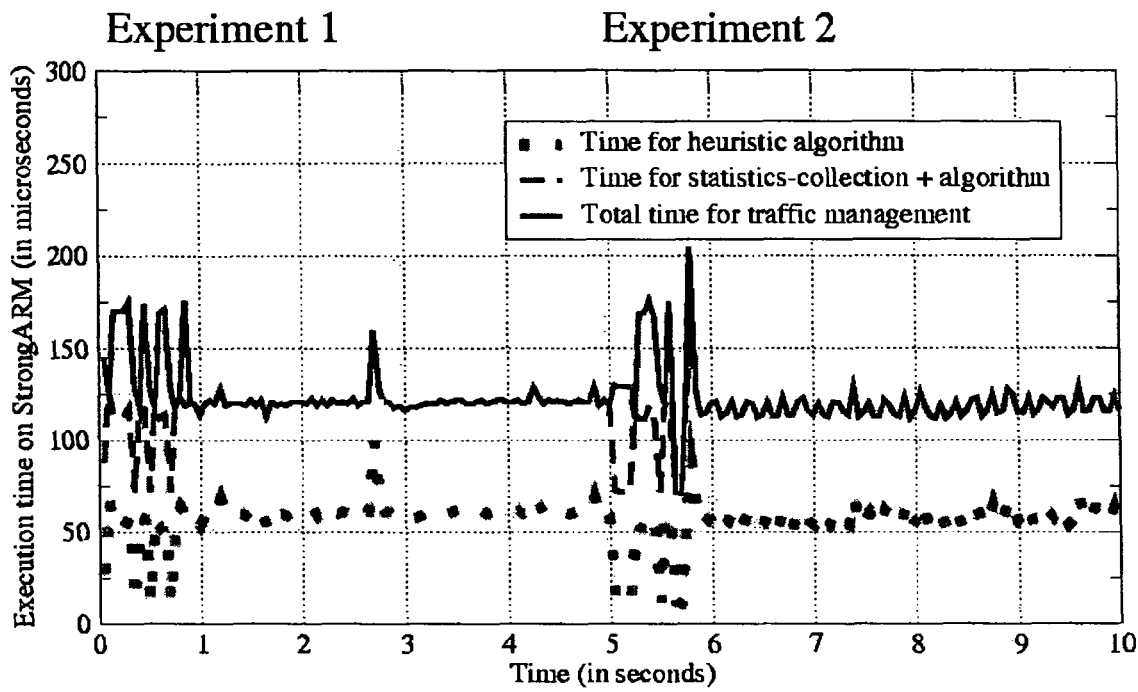
Figure 34. StrongARM execution time to run algorithm and to manage NoC traffic.
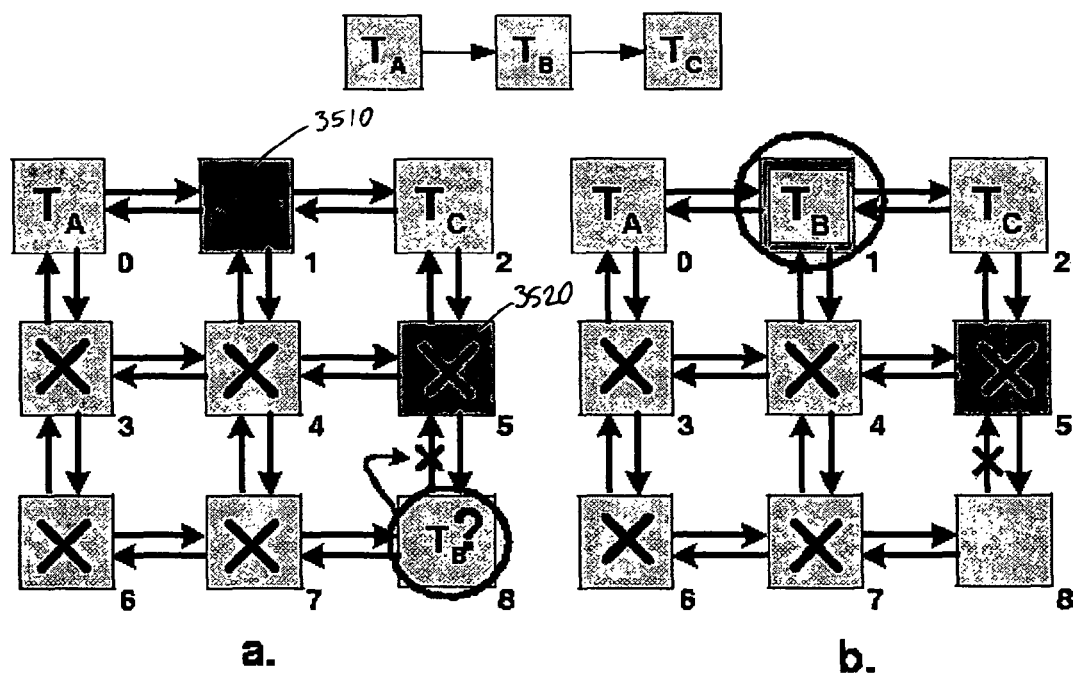
Figure 35: Hierarchical configuration example Figure 36A: Example application containing a multimedia pipeline (e.g. video decoding)

| NoC 3x3 LIGHT | | | | |
|---|---|---|---|---|
| Application | BT=0 | BT=1 | BT=2 | BT=3 |
| LIGHT | 100% | 100% | 100% | 100% |
| MEDIUM | 100% | 100% | 100% | 100% |
| HEAVY | 78.5% | 88.0% | 90.0% | 94.5% |

| NoC 3x3 MEDIUM | | | | |
|---|---|---|---|---|
| LIGHT | 100% | 100% | 100% | 100% |
| MEDIUM | 97.0% | 99.0% | 99.5% | 100% |
| HEAVY | 53.67% | 61.00% | 67.79% | 71.75% |

| NoC 3x3 MEDIUM - HopBandwidth | | | | |
|---|---|---|---|---|
| Application | Heuristic | Max | Min | Mean |
| LIGHT | 315 | 825 | 75 | 466 |
| MEDIUM | 570 | 1530 | 420 | 936 |
| HEAVY | 945 | 1890 | 720 | 1275 |

HETEROGENEOUS MULTIPROCESSOR NETWORK ON CHIP DEVICES, METHODS AND OPERATING SYSTEMS FOR CONTROL THEREOF

RELATED APPLICATIONS

This application is a continuation-in-part of U.S. patent application Ser. No. 10/453,899, filed on Jun. 2, 2003 now abandoned, hereby incorporated by reference. This application claims priority to U.S. Provisional Applications Nos. 60/524,768, filed on Nov. 25, 2003 and 60/569,204 filed on May 7, 2004, each of which is hereby incorporated by reference.

BACKGROUND OF THE INVENTION

1. Field of the Invention

The invention relates to Heterogeneous Multiprocessor Network on Chip Devices, preferably containing Reconfigurable Hardware Tiles, Methods and Operating Systems for Control thereof, said Operating Systems handling run-time traffic management and task migration.

2. Description of the Related Technology

In order to meet the ever-increasing design complexity, future sub-100 nm platforms will consist of a mixture of heterogeneous computing resources (processing elements, or PEs), further denoted as tiles or nodes. [R. Tessier, W. Burleson, "Reconfigurable Computing for Digital Signal Processing: A Survey", VLSI Signal Processing 28, p 7-27, 2001.] These loosely coupled (i.e. without locally shared memory) programmable/reconfigurable tiles will be interconnected by a configurable on-chip communications fabric or a Network-on-Chip (NoC), [S. Kumar, A. Jantsch, M. Millberg, J. berg, J. Soininen, M. Forsell, K. Tiensyrj, and A. Hemani, "A network on chip architecture and design methodology," in Proceedings, IEEE Computer Society Annual Symposium on VLSI, April 2002.] [A. Jantsch and H. Tenhunen, "Will Networks on Chip Close the Productivity Gap", Networks on Chip, Kluwer Academic Publishers, Dordrecht, The Netherlands, 2003, pages 3-18] [L. Benini, G. DeMicheli, "Networks on Chips: A new SOC paradigm?", IEEE Computer magazine, January 2002, William J. Dally, Brian Towles, "Route packets, not wires: on-chip interconnection networks," DAC 2001, p 684-689.].

Dynamically managing the computation and communication resources of such a platform is a challenging task, especially when the platform contains a special PE type such as fine-grain reconfigurable hardware (RH). Compared to the traditional PEs, RH operates in a different way, exhibiting its own distinct set of properties.

The (beneficial) use of a (flexible) Network-on-Chip to interconnect multiple heterogeneous resources has been illustrated before. [S. Kumar, A. Jantsch, M. Millberg, J. berg, J. Soininen, M. Forsell, K. Tiensyrj, and A. Hemani, "A network on chip architecture and design methodology," in Proceedings, IEEE Computer Society Annual Symposium on VLSI, April 2002.] [T. Marescaux, A. Bartic, D. Verkest, S. Vernalde, R. Lauwereins: Interconnection Networks Enable Fine-Grain Dynamic Multi-Tasking on FPGAs. Proc. 12th Int. Conf. on Field-Programmable Logic and Applications, Springer LNCS 2438 pages 795-805, Montpellier, September 2002.]

In order to execute multiple heterogeneous applications, an operating system is required. Nollet et al. give a general overview of different operating system components [V. Nollet, P. Coene, D. Verkest, S. Vernalde, R. Lauwereins, "Designing an Operating System for a Heterogeneous Reconfigurable SoC", Proc. RAW 2003, Nice, April 2003]

In the field of operating systems Singhal classifies the system depicted in FIG. 3A as a master-slave configuration. [Mukesh Singhal and Niranjan G. Shivaratri. "Advanced Concepts in Operating Systems: Distributed, Database and Multiprocessor Operating Systems". McGraw-Hill Series in Computer Science. McGrawHill, New York, 1994, pages 444-445].

Daily advises the usage of NoCs in Systems-on-Chips (SoCs) as a replacement for top-level wiring because they outperform it in terms of structure, performance and modularity. Because reconfigurable SoCs are targeted there is an extra-reason to use NoCs since they allow dynamic multitasking and provide HW support to an operating system for reconfigurable systems [W. J. Dally and B. Towles: Route Packets, Not Wires: On-Chip Interconnection Networks, Proc. Design Automation Conference, June 2001.].

Simmler addresses "multitasking" on FPGAs (Field Programmable Gate Arrays). However, in this system only one task is running on the FPGA at a time. To support "multitasking" it foresees the need for task preemption, which is done by readback of the configuration bitstream. The state of the task is extracted by performing the difference of the read bitstream with the original one, which has the disadvantages of being architecture dependent and adding run-time overhead [H. Simmler, L. Levinson, R. Manner: Multitasking on FPGA Coprocessors. Proceedings 10 Intl Conf. Field Programmable Logic and Applications, pages 121-130, Villach, August 2000.]. The need for high-level task state extraction and real dynamic heterogeneous multitasking is addressed in U.S. Ser. No. 10/453,899, fully incorporated by reference.

Rijpkema discusses the integration of best-effort and guaranteed-throughput services in a combined router. [E. Rijpkema et al.: Trade Offs in the Design of a Router with both Guaranteed and Best-Effort Services for Networks On Chip. Proc. DATE 2003, pages 350-355, Munich, March 2003.]

Nollet et al. explains the design of the SW part of an operating system for reconfgurable system by extending a Real-Time OS with functions to manage the reconfigurable SoC platform. He introduces a two-level task scheduling in reconfigurable SoCs. The top-level scheduler dispatches tasks to schedulers local to their respective processors (HW tiles or ISP). Local schedulers order in time the tasks assigned to them. Task relocation is controlled in SW by the top-level scheduler. [V. Nollet, P. Coene, D. Verkest, S. Vernalde, R. Lauwereins, "Designing an Operating System for a Heterogeneous Reconfigurable SoC", Proc. RAW 2003, Nice, April 2003] and U.S. patent application Ser. No. 10/453,899, fully incorporated by reference.

Mignolet presents the design environment that allows development of applications featuring tasks relocatable on heterogeneous processors. A common HW/SW behavior, required for heterogeneous relocation is obtained by using a unified HW/SW design language such as OCAPI-XL. OCAPI-XL allows automatic generation of HW and SW versions of a task with an equivalent internal state representation. [J.-Y. Mignolet, V. Nollet, P. Coene, D. Verkest, S. Vernalde, R. Lauwereins: Infrastructure for Design and Management of Relocatable Tasks in a Heterogeneous Reconfigurable System-on-Chip. Proc. DATE 2003, pages 986-992, Munich, March 2003] and U.S. patent application Ser. No. 10/453,899, fully incorporated by reference.

It has been previously demonstrated that using a single NoC enables dynamic multitasking on FPGAs. [T. Marescaux, A. Bartic, D. Verkest, S. Vernalde, R. Lauwereins: Interconnection Networks Enable Fine-Grain Dynamic Multi- Tasking on FPGAs. Proc. 12th Int. Conf. on Field-Programmable Logic and Applications, Springer LNCS 2438 pages 795-805, Montpellier, September 2002.] and U.S. patent application Ser. No. 10/453,899, fully incorporated by reference.

Experimentation on a first setup with a combined data and control NIC showed some limitations in the dynamic task migration mechanism. During the task-state transfer, the OS has to ensure that pending messages, stored in the network and its interfaces are redirected in-order to the computation resource the task has been relocated to. This process requires synchronization of communication and is not guaranteed to work on the first platform. Indeed, OS Operation and Management (OAM) communication and application data communication are logically distinguished on the NoC by using different tags in the message header. Because application-data can congest the packet-switched NoC, there is no guarantee that OS OAM messages, such as those ensuring the communication synchronization during task relocation, arrive timely. [T. Marescaux, A. Bartic, D. Verkest, S. Vernalde, R. Lauwereins: Interconnection Networks Enable Fine-Grain Dynamic Multi-Tasking on FPGAs. Proc. 12th Int. Conf. on Field-Programmable Logic and Applications, Springer LNCS 2438 pages 795-805, Montpellier, September 2002.]

Guerrier et al. provides structure to re-order the received packets. [Pierre Guerrier, Alain Greiner, "A Generic Architecture for On-Chip Packet-Switched Interconnections", Proc. DATE 2000, pages 250-256]

Run-time task migration is not a new topic and has been studied extensively for multicomputer systems since the beginning of the 1980s. These algorithms are not suitable for a Network-on-Chip environment. The tiles in a NoC only have a limited amount of memory. In addition, the NoC communication protocol significantly differs from the general protocols used for computer communication. These general protocols provide a lot of flexibility, but very low performance. Due to the specific characteristics of an on-chip network, such as a very low error rate and higher bandwidth, a NoC communication protocol will provide a different trade-off between performance and flexibility [S. Kumar, "On packet switched networks for on-chip communication" In A. Jantsch and H. Tenhunen, editors, Networks on Chip, chapter 5, pages 85-106. Kluwer Academic Publishers, February 2003]. In addition, the granularity of task mapping will be different. Most likely, a tile will not contain a full-blown application. Instead, a tile will only contain a single or a few tasks belonging to that application. In contrast to the multicomputer environment, this does not pose a problem, since the extremely tight coupling of the processing elements allows heavily communicating tasks to be mapped on different computing resources.

When benchmarking task migration mechanisms, the following properties will allow us to compare different mechanisms. The ideal task migration mechanism should have Minimal reaction time. The reaction time is defined as the time elapsed between selecting a task for migration until the task is actually ready to migrate (i.e. it reached its switchpoint).

Minimal freeze time. The migration mechanism should cause as little interruption as possible to the execution of the migrating task (and hence to the entire application). This means that the freeze time, illustrated by FIG. 19, needs to be minimized. This can be achieved on one hand by minimizing the time needed to capture and transfer the task state, on the other hand by minimizing the effort required to maintain message consistency.

Minimal residual dependencies. Once a migrated task has started executing on its new tile, it should no longer depend in any way on its previous tile. These residual dependencies are undesirable because they waste both communication and computing resources.

Minimal system interference. Besides causing minimal interference to the execution of the migrating task, the migration mechanism should avoid interference with other applications executing in the NoC or with the system as a whole.

Maximum scalability. This property determines how the migration mechanism copes with an increasing number of tasks and tiles in the NoC.

Assessment of Existing Message Consistency Mechanisms

The message consistency component of the migration mechanism described by Russ et al. [S. H. Russ, J. Robinson, M. Gleeson, J. Figueroa, "Dynamic Communication Mechanism Switching in Hector", Mississippi State Technical Report No. MSSU-EIRS-ERC-97-8, September 1997.] is based on using end-of-channel messages and an unexpected message queue. In this case, communication consistency is preserved by emptying the unexpected message queue before receiving any other messages received after completion of the migration process.

A similar technique to preserve communication consistency is described by Steliner [G. Steliner, "CoCheck: Checkpointing and Process Migration for MPI", Proceedings of the 10th International Parallel Processing Symposium, Honolulu Hi., April 1996.][G. Stellner, "Consistent Checkpoints of PVM Applications", Proceedings of the First European PVM Users Group Meeting, Rome, 1994.] The migrating task sends a special synchronization message to the other tasks of the application. In turn, these tasks send a ready message to each other. Messages that still arrive before the last ready message are buffered. In order to ensure message consistency, the migrated task is served with the buffered messages first.

These mechanisms are not applicable in a NoC. Due to the extremely limited amount of message buffer space it is impossible to store all incoming messages after a task reached its migration point. This implies that messages might remain buffered in the communication path as shown in FIG. 18. Adding more buffer space to accommodate these messages is not an option, because on-chip memory is expensive and the maximum amount of required storage is application dependent.

The Amoeba distributed operating system C. Steketee, W. Zhu, P. Moseley, "Implementation of Process Migration in Amoeba.", Proceedings of the 14th Conference on Distributed Computing Systems, pages 194-201, Poland, June 1994. offers a different way of dealing with the communication consistency issue: the consistency is built into the communication protocol. Incoming messages will be rejected while a task is migrating. The message source will be notified by a task is migrating or a not here reply message. This will trigger a lookup mechanism to determine the new location of the migrated task. In contrast to the previously described techniques, this technique does not require buffer space to queue the incoming messages during freeze time, which avoids a memory penalty in case of an upfront unknown amount of messages.

This technique is also not suited for a Network-on-Chip, since dropping and retransmitting packets reduces network performance and increases power dissipation [W. Daily and B. Towles, "Route Packets, Not Wires: On-Chip Interconnection Networks", in Proceedings of 38th Design Automation Conference (DAC), pages 684-689, Las Vegas, June 2001.] To ensure reliable communication in a task-transparent way, this technique also requires (costly) additional on-chip functionality [A. Radulescu, K. Goossens, "Communication Services for Networks on Chip", SAMOS II( ) pages 275-299, Samos, Greece, July 2002.] Furthermore, dropping messages potentially leads to out-of-order message delivery. Special message re-order functionality combined with extra buffer space is needed to get messages back in-order in a task-transparent way.

As explained, upon reaching a migration point, the task has to check if there for a pending switch request. In case of such a request, task migration needs to be initiated. One of the issues is the performance overhead this checking incurs during normal execution (i.e. when there is no pending switch request). Currently, the two main techniques to check for a pending switch request are:

Polling for a switch request. In this case, polling points are introduced into the execution code (into the source code by the programmer or into the object code by the compiler), where the task has a migration point. This technique is completely machine-independent, since the architectural differences will be taken care of by the compiler in one way or another. However, this technique potentially introduces a substantial performance cost during normal execution due to the continuous polling. This technique is used by task migration mechanisms implemented by [A. J. Ferrari, S. J. Chapin, and A. S. Grimshaw. Process Introspection: A Heterogeneous Checkpoint/Restart Mechanism Based on Automatic Code Modification. Technical Report CS-97-05, Department of Computer Science, University of Virginia.] [H. Jiang, V. Chaudhary, "Compile/run-time support for thread migration", Proceedings International of the Parallel and Distributed Processing Symposium (IPDPS), pages 58-66, April 2002.].

Dynamic modification of code (self-modification of code). Here the code is altered at run-time to introduce the migration-initiation code upon switch request. This way, these techniques can avoid the polling overhead. These techniques have their own downsides, like e.g. besides the fact that changing the code will most likely require a flush of the instruction cache, changing an instruction sequence the processor is currently executing can have a strange effect. This kind of technique is used by [Prashanth P. Bungale, Swaroop Sridhar and Vinay Krishnamurthy, "An Approach to Heterogeneous Process State Capture/Recovery, to Achieve Minimum Performance Overhead During Normal Execution*," Proceedings of the 12th International Heterogeneous Computing Workshop (HCW 2003)—held as part of the 17th International Parallel and Distributed Processing Symposium (IPDPS 2003), Nice, France, Apr. 22, 2003.] [P. Smith, N. Hutchinson, "Heterogeneous Process Migration: The Tui System", Software. Practice and Experience, 28(6), 611-639, May 1998.].

The communication QoS services offered by the AEthereal NoC are detailed in [A. Radulescu, K. Goossens, "Communication Services for Networks on Chip", SAMOS, p 275-299, 2002]. The AEthereal system contains both an end-to-end flow control mechanism and a bandwidth reservation mechanism. The flow control mechanism ensures that a producer can only send messages when there is enough buffer space at the consumer side. In case no flow control was requested at connection setup, the packets are dropped according to a certain policy. The bandwidth reservation mechanism provides guarantees on bandwidth as well as on latency and jitter by reserving an amount of fixed sized TDMA slots for a connection. The routing is based on the use of time-slot tables. In order to avoid wasting time-slots (i.e. bandwidth), it is possible to define part (e.g. request command messages) of the connection as best effort, while the other part (e.g. data stream as a result of the command) enjoys guaranteed throughput. However, in order to allocate a time-slot for a single connection, the required time-slot needs to be available for every router along the path [Edwin Rijpkema, Kees G. W. Goossens, Andrei Radulescu, John Dielissen, Jef L. van Meerbergen, P. Wielage, E. Waterlander, "Trade Offs in the Design of a Router with Both Guaranteed and Best-Effort Services for Networks on Chip", DATE 2003, p 350-355]. So finding a suitable (compile-time) time-slot allocation for all NoC connections is computationally intensive and requires heuristics that potentially provide sub-optimal solutions. Creating an optimal run-time time-slot allocation scheme requires a global (i.e. centralized) time-slot view, which is not scalable and slow. In contrast, distributed run-time slot allocation is scalable, but lacks a global view resulting in suboptimal resource allocations. Further research [J. Dielissen, A. Rădulescu, K. Goossens, E. Rijpkema, "Concepts and Implementation of the Philips Network-on-Chip", IP/SoC, 2003], however, revealed that the time-slot table present in every AEthereal router takes up 25% of the router area. The control logic to enable this local time-slot table takes up another 25%. Since initial on-chip networks will be small, AEthereal authors opted for a centralized approach that does not require a time-slot table in every router. Classic computer networks expose an entire spectrum of QoS classes with best effort service on one end and deterministic guaranteed QoS on the other end. In between, there is predictive QoS and statistical QoS. Here, the QoS calculation is based on respectively the past behavior/workload or a stochastic value. Although with these techniques the requested QoS can be temporarily violated, they improve the usage of communication resources with respect to the deterministic guaranteed QoS. This is why AEthereal combines best effort with guaranteed throughput. Reisslein et al. detail a statistical QoS technique based on regulating the amount of traffic a node can inject into internet like packet-switched networks.

SUMMARY OF CERTAIN INVENTIVE ASPECTS

In an embodiment of the invention, there is an arrangement having an on-chip communications network that interconnects computation resources of said arrangement, said on-chip communications network comprising a first on-chip data traffic network and a second on-chip control traffic network, said first and second on-chip networks being physically separated.

In another embodiment of the invention there is a method of dynamically reconfiguring a computing arrangement in a process for executing at least one application on said arrangement, said arrangement comprising at least one programmable processor as a management resource and a reconfigurable processing device as a computation resources, said application comprising a plurality of tasks, a number of said tasks being selectively executable as a software task on a programmable processor or as a hardware task on a hardware device, said method comprising configuring said reconfigurable device so as to be capable of executing a first plurality of hardware tasks, and after said configuring, executing a first set of tasks of an application substantially simultaneously on said platform, at least two of said tasks of said first set being substantially simultaneously executed as hardware tasks of said first plurality on said reconfigurable device, interrupting said execution of said first set, configuring said reconfigurable device such that at least one new hardware task other than one of the first plurality of hardware tasks can be executed, and executing a second set of said tasks to further executed said application, said second set including said new hardware task, the execution being substantially simultaneously on said platform, at least two of said tasks of said second set, including said new hardware task, being substantially simultaneously executed as hardware tasks of on said reconfigurable device, wherein said reconfigurable device, comprising a plurality of tiles, each tile defining a computation resource, and a network for providing communication between said tiles, said network comprising a first on-chip data traffic network and a second on-chip control traffic network, wherein during said configuring of said reconfigurable device, said communication network remains fixed.

In another embodiment of the present invention, there is a method for relocating a task from an original computation resources in an arrangement towards another destination computation resource, said arrangement having an on-chip communications network that interconnects computation resources of said arrangement, there being an operating system and an application running on said arrangement, the application processing application data, said arrangement comprising a first on-chip data traffic network, wherein said on-chip data traffic network handles communication of the application data, and a second on-chip control traffic network, wherein said on-chip control traffic network handles operation and management communications of the operating system, said first and second on-chip networks being physically separated, said method comprising sending a switch signal from said operating system to said original computation resource that a task executing on said original computation resource should stop running on said original computation resource, thereafter when said task reaches a migration point, said task informs via said operating system, thereafter tasks providing data towards said original computation resource are instructed by said operating system to send a last tagged message, thereafter said operating system creates said task on said destination resource, thereafter the operating system all messages on said original computation resource are forwarded towards said destination resource, and thereafter said destination resource when receiving a tagged message informs via the operating system the task sending such tagged message of its new position.

A method for relocating a pipelined task from an original computation resources in an arrangement towards another destination computation resource, said arrangement having an on-chip communications network that interconnects computation resources of said arrangement, there being an operating system and an application running on said arrangement, the application processing application data, said arrangement comprising a first on-chip data traffic network, wherein said on-chip data traffic network handles communication of the application data, and a second on-chip control traffic network, wherein said on-chip control traffic network handles operation and management communications of the operating system, said first and second on-chip networks being physically separated, said method comprising the steps of: sending of a switch signal from said operating system to said original computation resource that said pipelined task executing on said original computation resource should stop running on said original computation resource, and thereafter when said pipelined task reaches a state less point, it informs said operating system.

In an embodiment of the present invention, there is provided a switch point implementation method based on instruction address compare registers for an arrangement, said arrangement having an on-chip communications network that interconnects computation resources of said arrangement, said on-chip communications network comprising a first on-chip data traffic network, and a second on-chip control traffic network, said first and second on-chip networks being physically separated, said method comprising storing preemption points of an application running on a computation resource.

BRIEF DESCRIPTION OF THE DRAWINGS

FIG. 1 shows: (a) a heterogeneous multiprocessor NoC platform according to an embodiment of the present invention emulated by coupling an ISP (master) through an interface (I/F) with the slave processors (S), instantiated inside an FPGA and (b) Communication resource management according to an embodiment of the present invention.

FIG. 2 shows a Data NIC and the Control NIC connect the computing resource to the data NoC and the control NoC respectively according to an embodiment of the present invention.

FIG. 5 shows that an OS according to an embodiment of the present invention can specify a 'send window' by setting three window values. The low value (L) and the high value (H) respectively specify the low end and the high end of the 'send window'. By using the modulo value (M), the OS can spread a single send window (a) across the whole 'send spectrum' (b)(c).

FIG. 6 shows mapping of a Motion-JPEG application and a synthetic traffic generating application on a platform according to an embodiment of the present invention. M-JPEG application contains 4 tasks: Sender and Receiver are software tasks on the Strong-ARM (tile 3), Huffman block and IDCT block in hardware on tiles 1 and 8 respectively. The traffic generating application is instantiated on tiles 6 and 7. Hence, communication channel 7→6 is shared by both applications.

FIG. 11 shows three NoCs in an embodiment according to the present invention: reconfiguration network, a data network and a control network.

FIG. 12 shows an application Task Graph showing Input-Output port connections.

FIG. 13 shows destination Look-up Tables for every task in the graph.

FIG. 14 shows reconfigurable Tiles interfacing to all three NoCs through data and control NICs according to an embodiment of the present invention.

FIG. 15 shows that OS4RS sends a Reset command to an IP. Most of the processing is performed in the control NIC, making it HW support for the OS4RS. Control NIC is clocked at 22 MHz and control network is accessed by the ISP at 50 MHz.

FIG. 16 shows an embodiment according to the present invention wherein a micro-controller resides at the heart of a Control NIC.

FIG. 17 shows (a) how tasks are mapped onto the tile-based architecture in order to optimize a certain parameter, task $T_4$ is migrated from its original tile to a destination tile, and (b) a more detailed view of the migration mechanism employed to migrate $T_4$ according to embodiments of the present invention.

FIG. 18 shows how migration of task $T_3$ leaves a number of unprocessed messages in the communication input buffer of the source tile according to an embodiment of the present invention. In addition, there might still be a number of messages buffered in the communication path between $T_3$ and $T_1/T_2$ FIG. 19 shows a flow diagram of different steps of the general NoC task migration mechanism according to an embodiment of the present invention.

FIG. 20 shows forwarding buffered and unprocessed message to the destination tile according to an embodiment of the present invention. All last messages coming from the sender tiles are tagged.

FIG. 21 shows an MPEG-4 simple profile decoding pipeline

FIG. 22 shows typical dependencies between frames in an MPEG stream. Both series (before and after the stateless point) could be processed by a separate decoding pipeline.

FIG. 23 shows different steps of the pipeline migration mechanism.

FIG. 24 shows a comparison of freeze time between the general and the pipeline migration mechanism when migrating a pipeline.

FIG. 25 shows how moving a task of a closely integrated application (a) can increase usage of communication resources, increase interference with other applications and ultimately affect the application itself.

FIG. 26A shows capturing and transferring task state when migrating a task at run-time from computing resource (tile) X to computing resource (tile) Y according to an embodiment of the present invention.

FIG. 26B is a table showing HW overhead of Data and Control NICs, compared to the single NIC FIG. 27 shows that the data NIC collects communication statistics for the control NIC. The control NIC specifies the injection window to be enforced by the data NIC.

FIG. 28 shows a setup simulation model according to an embodiment of the present invention.

FIG. 29 shows a detailed simulation model according to an embodiment of the present invention.

FIG. 30 shows finding optimum send window values according to an embodiment of the present invention.

FIG. 31 shows NoC throughput comparison with and without OS communication management.

FIG. 32 shows NoC blocking comparison with and without OS communication management.

FIG. 33 shows comparison of maximum blocking times for the NoC communication with and without OS management.

FIG. 34 shows execution time of a processor such as StrongARM to run algorithm and to manage NoC traffic according to an embodiment of the present invention.

FIG. 35 shows a hierarchical configuration example according to an embodiment of the present invention.

FIG. 36A shows an example application containing a multimedia pipeline (e.g. video decoding)

DETAILED DESCRIPTION OF CERTAIN INVENTIVE EMBODIMENTS

Operating System Controlled Network on Chip

Figure 3:
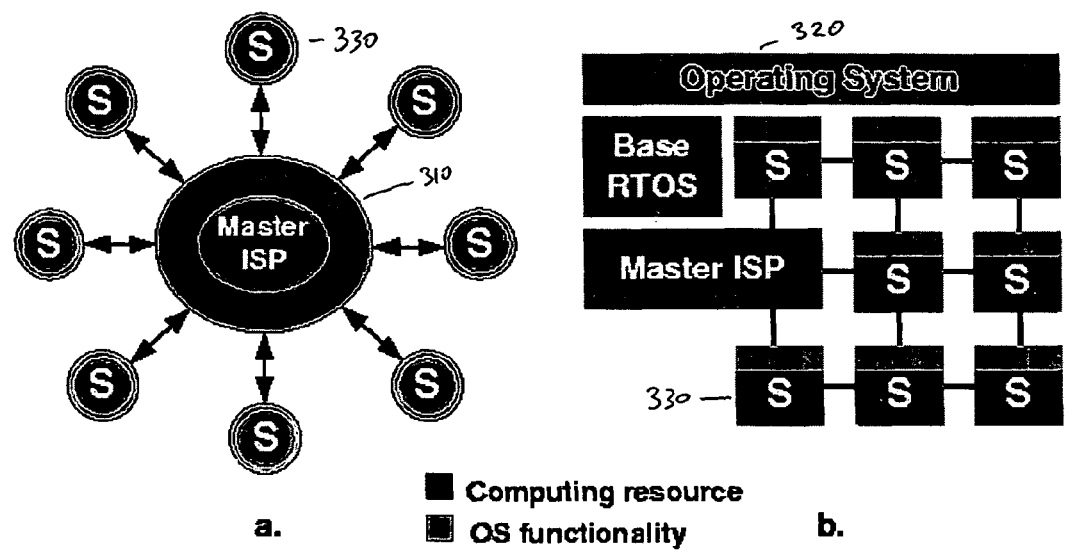
FIG. 3 shows a loosely coupled multiprocessor system organized in a master-slave configuration according to an embodiment of the present invention. The core operating system executes solely on top of the master ISP (a) and is created by extending an existing RTOS (b). The slaves (S) have their own local operating system functionality (a)(b). From an application point of view, a single OS manages the entire NoC system.

Managing a Network-on-Chip (NoC) that interconnects multiple heterogeneous computing resources in an efficient way is an extremely challenging task. In order to succeed, the operating system (i.e. the management layer) of the computing resources needs to be tuned to the capabilities and the needs of the NoC. Only by creating a tight interaction between the operating system and the NoC can the necessary flexibility be combined with the required efficiency.

The present invention details the management of communication resources in a system containing a Network-on-Chip and a closely integrated operating system, especially a packet-switched NoC and a closely integrated operating system. A NoC system in accordance with an embodiment of the present invention is emulated by linking an FPGA to a PDA. In accordance with an aspect of the present invention the NoC provides the operating system with the necessary information and the tools to interact. The OS is able to optimize communication resource usage. In addition, the operating system is able to diminish or remove the interference between independent applications sharing a common NoC communication resource.

In order to meet the ever-increasing design complexity, future sub-100 nm platforms will consist of a mixture of heterogeneous computing resources, further denoted as tiles or nodes. These loosely coupled (i.e. without locally shared memory) programmable/reconfigurable tiles will be interconnected by a configurable on-chip communications fabric or a Network-on-Chip (NoC).

The general problem of mapping a set of communicating tasks onto the heterogeneous resources of such a platform while managing the communication between the tiles dynamically is an extremely challenging task, that should be handled by an operating system. The mapping problem has been studied extensively in the Networks-Of-Workstations environment. These studies usually neglect the communication management between computing resources, since it is beyond the scope of the operating system. However, in the case of a Network-on-Chip according to the present invention the operating system is able to control the inter-processor communication. This ability should ensure that granted computing power matches communication needs, in order to provide the required quality of service.

As with off-chip networks, there is a challenge in designing the right network traffic management schemes. On one hand, these schemes should provide the required Quality of Service (QoS) guarantees for the applications, while efficiently using the network resources. On the other hand, the amount of resources (area, power, computation) required to enforce these schemes should be kept to a minimum. Most real-life multimedia applications tolerate an occasional and temporary failure in meeting the throughput constraints [M. Reisslein, K. W. Ross, and S. Rajagopal, "Guaranteeing statistical QoS to regulated traffic: The multiple node case," in Proc. 37th IEEE Conf. Decision and Control (CDC), Tampa, Fla., pp. 531-538, 1998], especially during the time-frame of starting a new application. One can take an advantage of this property to trade off deterministic QoS guarantees by offering a weaker form of QoS in order to reduce the required on-chip resources for traffic management schemes. There are in fact two communication issues when dealing with traffic management: flow control and congestion control. Flow control is a point-to-point data-link layer issue that deals with one data producer outrunning a single data consumer. Congestion control is a network layer issue concerned with handling network traffic when there are more packets in the network than it can deal with out losing packets or without much jitter (i.e. packet delay variations). In the domain of multimedia applications, this requirement of minimum jitter is as critical as the throughput requirement. The methods deal with network congestion by using a flow control mechanism to reduce the amount of traffic injected into the network by a particular data producer. Flow control mechanisms are important in running multimedia applications on a single NoC like emulation platform. While running these applications, it has been found that QoS requirements were met satisfactorily until there was an occurrence of messages getting blocked on the NoC. A blocked message is a message that gets blocked in the source data router buffer while waiting for the release of the reading data router buffer of the destination tile. When the blocking on the NoC was started, throughput decreased considerably along with an increase in jitter. Further it was found that one can achieve reasonable QoS guarantees (though not deterministic) in term of throughput and jitter by only an intelligent control of the blocking on the NoC, In this way a weaker form of QoS is achieved that is satisfactory for multimedia applications. An embodiment of the present invention integrates a traffic management scheme inside a NoC platform to control the blocking on the NoC. In this NoC communication management scheme, the central operating system (OS) is able to monitor the traffic at every tile-NoC interface. Based on this information the OS can perform traffic shaping by limiting the amount of packets a tile is allowed to inject into the NoC. This way, the OS can match the packet rate of the data producer with that of the data consumer (i.e. flow control) to control network congestion.

Heterogeneous Multi-Processor SoC

A multi-core SoC according to an embodiment of the present invention contains a number of heterogeneous, loosely coupled processing elements, as seen in FIG. 3A. The processing elements may comprise microprocessors. One of the processing elements 310 is denoted as master because it executes a part, e.g. a core, of the operating system 320. In addition to monitoring the behavior of the global system, this mainly involves assigning tasks to the different processing elements in the system. The processing elements 330 of the SoC other than the master may be described as slaves. In one aspect any of the processing elements can take on the functionality of a master node. Singhal classifies such a system as a master-slave configuration. Because the operating system is executed by a single processor, it can be implemented in an efficient way (e.g. it does not require the use of multiprocessor OS synchronization primitives). However, a potential drawback of this configuration is that the master processor 310 can become a bottleneck. Consequently, the processing potential of the system will not be fully utilized. This problem can be alleviated by providing limited local operating system functionality in every slave node 330, as seen in FIG. 3A.

System Description

Multiprocessor NoC Emulation

FIG. 1A shows a multiprocessor system according to an embodiment of the present invention is emulated by linking a microprocessor 110, especially a processor core such as a StrongARM processor, e.g. present inside an IPAQ PDA, to a digital logic element such as a programmable gate array 120, e.g. an FPGA, for example by means of the IPAQ extension slot. The FPGA contains the slave processors 130, the NoC 140 and the master ISP interface component 150.

The central OS executes on top of the master PE and is responsible for assigning resources (both computation and communication) to the different tasks. As seen in FIG. 1B, the OS keeps track of the computation resources by maintaining a list 160 of PE descriptors. The communication resources are maintained by means of an injection slot table that indicates when a task is allowed to inject messages onto a link of the NoC. Every tile contains a destination lookup table (DLT) that enables a task to resolve the location of its communication peers. The NoC provides the OS with a set of tools to monitor the resources and to enforce its decisions.

FIG. 2 shows a packet-switched NoC according to an embodiment of the present invention implemented as an N×N, e.g. a 3×3, bidirectional mesh and actually consists of two parallel NoC's: a data traffic NoC 210, responsible for delivering data packets for tasks executing on the computing resources 220, e.g. payload, and a control data NoC 230 used for control messages such as OS-control messages. This arrangement ensures that OS control messages do not interfere with the data circulating on the data traffic NoC. This separation also provides the essential mechanism to control the traffic even when there is congestion on the data NoC. Both NoC's are clocked at a certain frequency, e.g. 30 MHz, while the StrongARM processor, present in the PDA, is clocked at a higher frequency, e.g. 200 MHz.

NoC Network Layer

In one aspect the NoC is a packet-switched network having routers. The routers of the network can use virtual cut-through switching, which means that incoming packets are forwarded as soon as they arrive if the required output channel is free. To avoid head of line blocking, messages can be buffered at the output of the router. A routing algorithm is provided. The routing algorithm can be based on a lookup table. The router determines on which output port the packet should be sent, by combining routing information, e.g. the routing table information, with the destination information present in the header of a packet. This network need not contain any structure to re-order the received packets, in contrast to the proposal of Guirrier, et al. For example, the NoC can assume that messages are delivered in the order they have been sent.

NoC Transport Layer

Data Network Interface Component

The computing resources 220 of a SoC in accordance with an embodiment of the present invention are interfaced to the packet-switched data NoC 210 by means of a data Network Interface Component (NIC) 240, as seen in FIG. 2. From the computing resource viewpoint the main role of the data NIC 240 is to buffer input and output messages and to provide a high-level interface to the data router 250. The data NIC 240 is also responsible for collecting the local computing resource message statistics. This involves keeping track of the number of messages sent, received and blocked. The blocked message count denotes the number of messages received, that have been blocking the data router buffer while waiting for the computing resource input buffer to be released. Moreover, the data NIC 240 implements an injection rate control mechanism, allowing control of the amount of messages the attached computing resource injects in the data NoC 210 per unit of time. An exemplary NIC can be seen in greater detail in FIG. 27.

Control Network Interface Component

Each node in a system according to an embodiment of the present invention is also connected to a control Network Interface Component (NIC) 260, as seen in FIG. 2. A main role of the control NIC 260 is to provide the OS with a unified view of the communication resources. For instance, the message statistics collected in the data NIC 240 are processed and communicated to the core OS 280 by the control NIC. The control NIC also allows the core operating system to dynamically set the routing information, e.g. the routing table in the data router or to manage the injection rate control mechanism of the data NIC.

Another role of the control NIC is to provide the core OS with an abstract view of the distributed computing resources. Hence, it is considered as a distributed part of the operating system.

As FIG. 16 illustrates, the heart of the Control NIC contains a micro-controller responsible for executing the commands it receives from the core operating system and for monitoring/adjusting the other functional components of the tile such as Data NIC and Data Router. The core operating system is executed on the master Instruction Set Processor (ISP). To this end, the instruction memory of the micro-controller contains all the required operating system functionality. The Control NIC receives control messages from the core OS. After decoding the contents of the control message, the Control NIC is able to execute the function requested by the core OS with the provided parameters. The return value of the executed function is, in turn, wrapped into a control message to be transmitted to the core OS. Upon certain events, the partial OS functionality in the micro-controller can initiate communication with the core OS in a similar way. In addition, the core OS is able to update the instruction memory of the micro-controller in order to add/remove or alter the local OS functionality. This way, OS functionality can be updated in a fast and easy way. This is important for e.g. applying bug-fixes, supporting new functionality added within the core OS, adding debug functionality to improve visibility in the NoC, etc.

Operating System

In one embodiment the operating system is built as an extension of an existing RTOS, as seen in FIG. 3B. The extensions provide an extra layer of abstraction required to have a view of the complete heterogeneous system.

Figure 4:
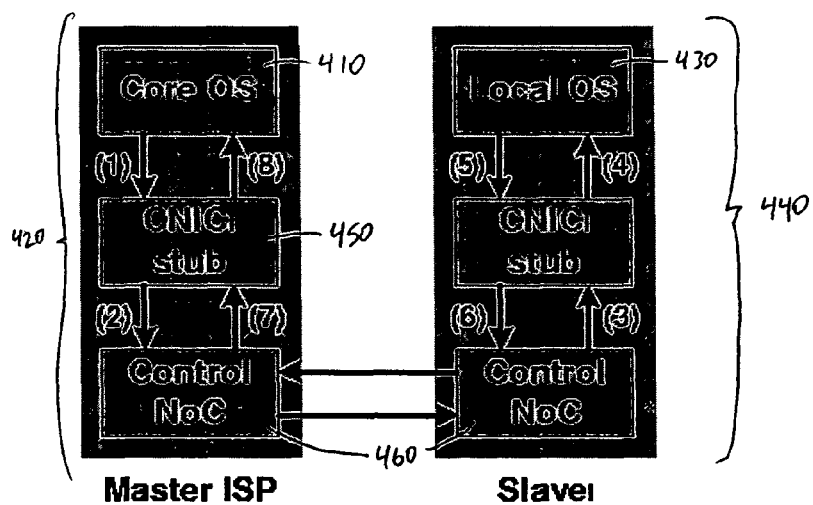
FIG. 4 shows remote execution of an OS function call on a slave node according to an embodiment of the present invention.

The interaction between the core of the operating system 410, executing on the master ISP 420, and the local OS functionality 430 executed on the Control NIC's, present in the slave nodes 440, resembles classic remote procedure calling (RPC), as seen in FIG. 4. The operating system maintains for each control NIC a structure that describes its functionality and that allows the core OS to remotely execute a function on a slave node. So the control NIC structure in the operating system can be seen as the RPC stub. FIG. 4 illustrates how the slave OS functionality is used. First of all, the core OS 410 makes a function call to the respective control NIC stub 450 (1). This stub translates the call into a control message containing the desired function number and its required parameters. Consequently, this message is sent to the slave node 440 (2) via the Control NoC 460. Once the message is received on the slave node 440 (3), its function number and parameters are unwrapped and the respective local OS function executes at the slave node (4). The return value (5) is packed into a message (6), sent over the control NoC 460 to the CNIC stub 450, where it is unpacked (7). Finally, the original core OS function call returns with the respective return value (8).

Certain network events (e.g. a synchronization event) require action from the core OS 410. In such a case, the slave node 440 initiates a function call toward the core operating system 410, by means of the same mechanism. Calls are therefore bidirectional. Thanks to the coupling between the core of the operating system (executing on the main ISP 420) and the operating system functionality present in the control NICs, the OS is able to create an environment where multiple concurrent applications can share the computing and communication resources with minimal interference.

NoC Control Tools

In accordance with an aspect of the present invention a distributed, NoC-aware operating system can manage the inter-processor communication. In order to do so, the operating system requires information about the status of the NoC and the tools to act upon that information.

Dynamic Statistics Collection

In order to make any management decision, the operating system according to the present invention is aware of the status of the communication in the NoC. For example, the operating system polls the control NICs at regular intervals to obtain the traffic statistics, e.g. by using a remote function call or similar. This kind of information is vital for managing the communication in the NoC. Especially the blocked message count is important: these messages potentially disturb other data traffic passing through the same channel. Blocked messages occur when the receiving computing resource is unable to process its input fast enough.

The operating system is able to solve this blocking issue in one embodiment by forcing the source of the messages to send fewer messages per time unit, i.e. by rate control. In another embodiment, e.g. in the case that the blocking behavior is unpredictable, the OS can reroute the other streams (e.g. jitter-sensitive multimedia streams) in order to avoid the congested link. The NoC tools that enable these solutions are presented below Dynamic Injection Rate Control By providing a message injection rate control function, the control NIC allows the OS to limit the time wherein a certain processor in a slave node is allowed to send messages onto the network. This time is called the send window of the processor.

The (remote) function to set the send window expects three parameters: a value to specify the low end of the send window, a value to specify the high end of the window and a modulo value. By setting the low and high value, the OS is able to describe a single send window within the whole send spectrum as seen in FIG. 5A. However, by also using the modulo value, this single send window can be spread over the whole send spectrum, as seen in FIGS. 5B and 5C.

This technique is further denoted as a window-spreading technique in this paper. From an operating system point of view, setting a window is deterministic and fast: it takes on average of 57 µs (e.g. standard deviation equals 1.83 µs) to change the window values of a certain computing resource.

OS-Controlled Adaptive Routing

The operating system can also manage communication by changing the routing table of a router in order divert a message stream from one channel to another. This allows, for example, to avoid an already congested link in the NoC. Since changing a routing table in the NoC is a complex operation, the OS performs the following steps when changing the route of a flow that passes through data router R on router output O.

Task synchronization. The source task of every flow passing through router R on output O needs to be synchronized in order to assure in order delivery of messages. This involves sending a synchronization request to every source task and waiting on a synchronization acknowledge from the receiving side, indicating that the channel is empty.

Routing table update. Using a remote function call, the operating system sends the new routing table coefficients to the router.

Synchronized task release. In this step, the operating system notifies all synchronized tasks to resume sending messages.

A synchronization/release remote function call does not require any parameters and takes on average 53 µs (standard deviation equals 0.75 µs). However, the actual time needed to perform a complete synchronization (i.e. making sure that a certain channel is cleared) also depends on other parameters (e.g. channel blocking). The remote function to change a routing table takes as much parameters as there are entries in the routing table. For example, for a 3×3 network (9 entries), changing a routing table requires on average 61 µs (standard deviation equals 1.3 µs).

Note that changing a routing table affects all streams passing through the router on the respective output. This means, for example, that satisfying the quality-of-service request for a single application will potentially have a (minor) interference with another application.

Traffic Management Exploration Simulation Model

Due to the long turnaround cycle for the experiments on a NoC emulation platform, developing a communication management scheme using the platform is not a viable option. Hence, a simple simulation model, shown in FIG. 28, was developed. The model is built on top of the OMNET++network simulation environment. FIG. 29 shows the model in detail. It contains the following blocks: (a) Two producers 2910 to generate messages and two corresponding consumers 2920 to receive the messages over the network; (b) a control NIC 2930 and data NIC 2940 on top of each producer and consumer to support the injection rate control mechanism and also to gather the statistics regarding number of messages sent/received/blocked, (c) Data NoC routers 2950 with a round-robin scheduler, (d) an OS 3060 to monitor the data NoC 3070 through the control NoC 3080. The producer generates messages to be dispatched on the data NoC which pass through the data NIC before arriving in the network. The rate of injection of the messages is controlled by the data NIC which gets the injection parameters from the centralized OS via the control NIC. A windowing mechanism, discussed in FIG. 5, is used for achieving this communication control. The data NoC takes in these messages from the two producers in a round-robin fashion and forwards them to the destination consumers. The OS meanwhile collects periodically the statistics of the message traffic in order to take communication management decisions. Note that, the link between a producer and a consumer can be over multiple hops on the NoC. From the blocking perspective, such multiple hops can be abstracted as a single link.

Experiments With The Simulation Model

To validate the platform simulation model, initial observations in terms of throughput and blocking on the NoC platform are verified with those on the simulation model. Many simulation model parameters are picked up from the ones on the NoC platform e.g. for achieving injection rate control mechanism, as shown in FIG. 5. The whole send spectrum is divided into time-slots, each 100 microseconds (µs) wide. The OS sampling rate for gathering the NoC communication statistics is 50 ms. As a QoS requirement, the user specifies the required communication bandwidth between a producer-consumer pair for the simulated user applications.

The model is used to study two important aspects of NoC communication. First is how blocking affects throughput and jitter on the NoC and the second is how to deal with such a blocking, so as to provide the user-specified QoS throughput along with a minimization of jitter. For studying the first aspect, one communicating producer-consumer pair is modelled. This model is then extended with another producer-consumer pair to estimate the effects of sharing common NoC resources on throughput and jitter. In the second aspect of dealing with this blocking, the injection rate control mechanism is used to control blocking on the NoC.

For the experiments, the producer is modelled in two different modes—one in which the producer generates messages with a normal distribution over time and the other in which it generates messages periodically in bursts. The first one is a general case of a producer whereas the second one resembles more multimedia related applications as targeted by the NoC platform. For example, a Motion-JPEG decoder at 25 frames per second will generate a burst of data messages with every frame i.e. at every 40 milliseconds (ms). In addition, a variation in the burst magnitude is also modeled to study how it affects the NoC communication.

Initial experiments brought forward two important observations. One is that blocking on the network drastically affects incremental throughput and introduces non-deterministic jitter on the NoC. The other is that if the NoC traffic is kept at the level just below where blocking starts, the network resources are utilized at their maximum. This point where the blocking starts depends on various factors such as the difference between consumer-producer input-output rates, input-output buffer sizes in consumer-producer, message buffer spaces on routers and the routing algorithm. Hence, an algorithm was developed to find such a point at run-time on the NoC in order to achieve the maximum resource utilisation.

Traffic Management Algorithm

Even for one producer-consumer pair, the search space for achieving the optimum NoC communication using the best possible send window values is large. Hence the experiments focused on finding a heuristic algorithm to get close to the optimum values. The detailed description of the algorithm is presented in the Algorithm below. The main principle behind this algorithm is to control the injection rate on the producer side such that the message traffic on the data NoC operates just below the point where the blocking on the data NoC starts. Here the possibility is explored of achieving the required QoS throughput only by controlling the message injection rate.

Another additional feature of the run-time traffic management method is to provide a method for calculation of communication slots (start, stop, duration), by characterizing the producer output. The algorithm execution time to reach the optimum point is thereby reduced. The number of iterations needed to reach this point depends on the send window values at the start of the computation. Note that in case of bursts in communication, the user-specified application bandwidth requirement is not enough on its own to calculate good starting send window values. Instead, the good starting send window values can be found by characterizing the producer output. The approach is to profile the producer output to deduce the characteristics such as periodicity, width and magnitude of bursts. Using these profiled values, the algorithm can (re) calculate the starting send window values to reach the optimum point quicker. This producer characterization task can be integrated inside the data and the control NICs, causing no extra overhead for the OS.

---
Algorithm for Finding Send Window Values for a Tile
---

```
// StartWin : Pre-calculated starting send window
NewWin = StartWin;
loop
    SetWindow(NewWin); // set only if values change
    CurrWin = NewWin; // note current window values
    Wait for the duration of sampling;
    Get the message statistics i.e. \emph{CurrStats};
    if (CurrStats.Blocking > THRESHOLD)
        if (FoundWinValues = true)
            // Recalculate optimum window values
            FoundWinValues = false;
            NewWin = StartWin;
            Reset(BestWin, BlockingWin);
        else // Yet to find optimum send window values
            // Decrease the send window depending on \% of
            // blocking with number of messages sent
            NewWin = Reduce(CurrWin);
            BlockingWin = CurrWin;
        endif
    else if (CurrStats.Thruput < REQUIRED)
        // Check whether throughput is consistently low
        // Currently this function checks only past
        // two iterations.
        if (ConstLowThruput(CurrStats) = true)
            // Increase the send window while making
            // sure that it does not touch BlockingWin
            NewWin = Increase(CurrWin, BlockingWin);
        endif
    else
        // Everything ok, no change in windows needed
    endif
    // Check whether windowing values are stabilized
    // Currently this function checks stability over only
    // past two iterations.
    if (WinValStable(CurrWin, NewWin)=true)
        if (CurrStats > BestStats)
            BestWin = CurrWin; // optimum window values
            BestStats = CurrStats;
        endif
        // Check if window values can be more spread.
        if (CanSpreadWin(CurrWin) = true)
            // Currently Spread() divides windowing values
            // by a factor of 2 (Figure \ref{fig:window})
            NewWin = Spread(CurrWin);
        else // Exhausted window spreading
            NewWin = BestWin;
            FoundWinValues = true;
        endif
    endif
end loop
```

Initially, only one producer-consumer pair is used. The OS determines the initial injection rate depending on the user-specified throughput requirement and the available network bandwidth. Due to burst-like communication, there could be some blocking on the NoC. OS then tries to spread the message injection by using the window-spreading technique, as shown in FIG. 5. While doing the window-spreading, for each modulo value (M), the send window low (L) and high values (H) are found at which blocking on NoC starts. After maximally spreading over the send spectrum with different send window values of high and modulo, the value at which the data NoC delivers the best communication in terms of throughput and blocking is chosen and used thereafter. If a significant amount of blocking appears in future, for example due to a change in burst characteristics or due to additional traffic on the NoC generated by another producer, then the send spectrum is again searched in order to eliminate blocking.

The efficiency of this algorithm is measured in terms of two key factors—one regarding blocking, throughput and jitter with the NoC communication and the second regarding the resources that the algorithm will use for its computation. It has been found that the send window modulo (M) value of 16 was a good starting point for the window-spreading. The higher this number the more iterations are needed to reach the optimum. Typically one higher order (a factor of two in case of this algorithm since it uses a window-spreading factor of two as shown in FIG. 5) of starting modulo value will result in some more, e.g. four-five iterations more before finding the optimum.

Moreover, in order to avoid any incorrect decisions due to potential irregularities in bursts during one sampling period, the OS uses more than one sampling period (e.g. three) before deciding about the stability of traffic characteristics. FIGS. 30, 31, 32 and 33 show different aspects of the algorithm execution. As mentioned earlier, initially only a single producer-consumer pair is communicating (labelled as Experiment 1) on the NoC. In the simulation setup, the producer was modelled such that after five seconds (labelled as Experiment 2), the same number of messages are produced with the same periodicity but in half the amount of time causing heavier blocking on the NoC. FIG. 30 shows that the algorithm takes on average 16 iterations (i.e. 800 ms with a sampling rate of 50 ms) to (re)calculate the optimum send window values. FIG. 30 also shows how the algorithm tries to converge to the optimum window values as explained earlier. The results of such achieved communication are compared with the maximum possible values when the network bandwidth is fully available for the NoC communication without any OS intervention (i.e. best effort service).

As shown in FIG. 31, it is found that by staying just below where the blocking starts on the NoC, the total throughput is very close to the one achieved with the best effort service. At the same time, as seen in FIG. 32, the present communication management scheme completely eliminates blocking on the NoC except during (re)calculations of the send window values. This exceptional blocking happens because there is a change in the NoC traffic characteristics either due to a change in burst characteristics or due to an introduction of the second producer-consumer pair. FIG. 33 plots the maximum blocking times that a message gets blocked on the NoC. Again, it shows that except during a (re)calculation of the optimum send window values, there is no blocking on the NoC. This will ensure minimizing jitter on the NoC. Overall, by staying just below the blocking, the algorithm makes sure that the network resources are used as efficiently as possible for a particular producer-consumer pair on a particular link of the NoC. In order to calculate the amount of resources that the algorithm needs for its implementation, the algorithm was run on the NoC platform OS running on a StrongARM (SA1110) based handheld device. On the NoC emulation platform it was determined that at every sampling time, the OS takes 60 microsec to gather communication statistics from a producer tile.

From these message statistics and the old send window values at every sampling iteration, the algorithm calculates new send window values in 65 microsec on average, as seen in FIG. 35, with a minimum of 12 microsec and a maximum of 120 microsec. In case, the window values have changed, the OS needs to modify the injection rate at the producer tile. This operation for setting window values on a tile takes 57 microsec. Totally, incorporating such a traffic management inside the NoC platform OS takes on an average 182 microsec at every sampling i.e. every 50 ms in the experiments. On the 3×3 mesh NoC platform, in the worst case, if there is a traffic on each and every link on the NoC, the algorithm will consume a maximum of 2-3% of StrongARM execution time. Such a low overhead for NoC traffic management should be acceptable in real-life multimedia applications.

In a particular NoC configuration described with respect to FIG. 35, two tiles 3510 and 3520 (1 and 5, respectively) are composed of fine-grain reconfigurable hardware (i.e. FPGA fabric). These tiles are suited for computational intensive tasks, but can only accommodate a single task. The mapping heuristic will have to find the best fitting task for every reconfigurable hardware tile, since some tasks can be too big for a certain RH tile (i.e. cannot be placed on that tile), while other tasks cause internal fragmentation (i.e. waste RH area because the task size is smaller than the tile size).

Resource Management Heuristic

The resource management heuristic consists of a basic algorithm completed with reconfigurable add-ons. The basic heuristic contains ideas from multiple resource management algorithms [Y. Wiseman, D. Feitelson, "Paired Gang Scheduling", IEEE Transactions on Parallel and Distributed Systems, pp 581-592, June 2003., Jong-Kook Kim et al., "Dynamic Mapping in a Heterogeneous Environment with Tasks Having Priorities and Multiple Deadlines.", Proc. 17th International Parallel and Distributed Processing Symposium, France, 2003 J. Hu, R. Marculescu, "Energy-Aware Communication and Task Scheduling for Network-on-Chip Architectures under Real-Time Constraints", DATE 2004, pp 234-239.] except for the novel aspects of the present invention. These lay in compiling the known ideas into a suitable run-time management heuristic. In addition, a set of RH add-ons were created that allow the basic heuristic to deal with the specific properties of RH. These add-ons aim to improve the performance of the heuristic and to create extra management opportunities in the presence of RH.

Basic Heuristic

In order to assign resources to an application containing multiple communicating tasks, the heuristic requires the application specification, the user requirements and the current resource usage of the platform as input. The application is specified by means of a task graph that contains the properties of the different tasks (e.g. support for different PE types) and the specification of the inter-task communication. The user requirements are specified by means of a simple in-house QoS specification language (similar to the ones specified by [Jingwen J. Jin, K. Nahrstedt, "Classification and Comparison of QoS Specification Languages for Distributed Multimedia Applications", University of Illinois at Urbana-Champaign, 2002.]). The different steps to come to a complete resource assignment of an application are as follows.

1. Calculating requested resource load. Based on the task load specification function provided by the application designer and the user requirements, the heuristic calculates the real computation and communication task load. In case of a video decoding task, for example, the frame rate, resolution and decoding quality requested by the user will affect both the computation and communication resource requirements of the task.
2. Calculate task execution variance. For every task $T_i$ in the application, determine its execution time variance on the different supported PE types and normalize that value by the number of evaluated PE types ($V_{Ni}$). Tasks with a high $V_{Ni}$ are very sensitive to which processing element they are assigned to. In addition, tasks that can only be mapped on one specific PE should be mapped before all other tasks. This way, the heuristic avoids a mapping failure, that would occur if this specific PE would be occupied by another task.
3. Calculate task communication weight. For every task $T_i$ in the application, determine its communication importance $C_i$ (both incoming and outgoing) with respect to the total inter-task communication of the application. This allows the algorithm to order the tasks based on their communication requirements.
4. Sort tasks according to mapping importance. The mapping priority of a task $T_i$ is equal to $V_{Ni} \times C_i$. Tasks are sorted by descending priority.
5. Sort PEs for most important unmapped task. This step contains two phases. First, the allocation priority of the PEs for a task $T\_{i}$ is determined based on the weighted product of the current PE load and the already used communication resources to the neighboring PEs. The weights are determined by the computation and communication requirements of the unmapped task. This allows the algorithm to match tasks that combine a high need for processing power and a low need for communication resources with their counterparts. Secondly, in order to map heavily communicating tasks close together, the allocation priority is also multiplied with the hop-bandwidth product (i.e. the product of the amount of assigned communication injection slots between two tasks and the hop-distance between them) of the current task and its already placed communication peers. PEs that lack the required computation resources (phase 1) or that do not provide enough communication resources to the already placed tasks (phase 2) have their allocation priority set to infinity, indicating that the PE is not fit to accommodate the unmapped task.
6. Mapping the task to the best computing resource. The most important unmapped task is assigned to the best fitting PE. Consequently, the platform resource usage is updated to reflect this assignment. Steps 5 and 6 are repeated until all tasks are mapped.

Occasionally this greedy heuristic is unable to find a suitable mapping for a certain task. This usually occurs when mapping a resource-hungry application on a heavily loaded platform. The classic way to solve this issue is by introducing backtracking. Backtracking changes one or more previous task assignments in order to solve the mapping problem of the current task.

The backtracking algorithm starts by undoing N (start by N equals one) previous task resource allocations. Then, the PEs are sorted, but instead of choosing the best PE for a certain task, the second best PE is selected. If this does not solve the assignment issue for the current task, backtracking is repeated with N+1. Backtracking stops when either the number of allowed backtracking steps is exhausted or when backtracking reached the first task assignment of the application. In that case, the algorithm can (a) use run-time task migration to relocate a task of another application in order to free some resources, (b) use hierarchical configuration or (c) restart the heuristic with reduced user requirements.

Reconfigurable Hardware Add-ons

Incorporating RH tiles requires some additions to the basic mapping heuristic in order to take reconfigurable hardware properties into account.

The first set of additions are applied after step 5 of the basic mapping heuristic (i.e. after sorting all suitable PEs). These changes deal with the following properties:

Fragmentation of reconfigurable area. In case both the first and second priority tile are RH tiles. The heuristic will re-evaluate their priority using a fragmentation ratio in order to minimize the area fragmentation. Intuitively it is easy to understand that if placing the task on the highest priority tile causes 80\% area fragmentation while the second priority tile only causes 5% area fragmentation, it might be better to place the task on the latter.

Computational gain. Due to the attempt at load-sharing of the heuristic algorithm and the binary state of the reconfigurable tiles (i.e. either 0\% load or 100% load), RH tiles are often selected as best mapping candidates. Obviously, it would not be wise to sacrifice a RH tile when a regular PE could do a similar job. Therefore, if the highest priority tile for a certain task is a RH tile, while the second priority tile is a regular PE, the heuristic will use a load ratio to re-evaluate their priority to avoid wasting RH computing power.

The second set of additions involves hierarchical configuration, i.e. the use of softcore PEs instantiated on RH tiles. There are two situations where this technique can improve mapping performance. First, when the task binaries are not supported by the platform PEs, a suitable softcore can be instantiated on a RH tile. This means the heuristic first needs to determine where to instantiate the softcore This is done by going over all softcores that are (1) supported by the task, (2) that fit on the available (i.e. free) RH tiles and (3) provide the required computing power. After finding a suitable location, the softcore is instantiated. From that moment on, the regular heuristic algorithm applies. Secondly, this technique can be used as an alternative to backtracking.

Consider the mapping example discussed previously with respect to FIGS. 35A and 35B, where task B still needs to be assigned. Since B has no RH support (tile 1) and all other tiles are occupied or unsupported, B can only be assigned to tile 8. Although tile 8 can provide the required computing resources, it lacks the required communication resources to support the communication between B and C. Without hierarchical configuration, the heuristic has no other option but to reconsider the mapping of A and C (i.e. perform backtracking). In case A and C are only supported on respectively tile 0 and tile 2, the heuristic will even need to reallocate resources of other applications (e.g. moving tasks from tile 4 to tile 8) in order to free resources. However, by means of hierarchical configuration, B can be mapped on a softcore instantiated on RH tile 1, as seen in FIG. 35B. Also from a hop-bandwidth point of view (i.e. mapping quality), it is better to map B on a softcore on RH tile 1 than on tile 8.

Heuristic Performance Evaluation

The performance of the heuristic was assessed by comparing it to an algorithm that explores the full solution space. The performance experiments consist of mapping a typical test application as seen in FIG. 36A on a 3×3 NoC containing four PE types.

In order to include the current load of the platform and the user requirements into the mapping decision process, three types of load have been defined: LIGHT, MEDIUM and HEAVY. In case of platform load, they indicate that no platform resource (both computation and communication) is used for more than respectively 25%, 50% and 75%. A random function determines the actual resource usage for every resource. If the random function returns 50% or more usage on a single task tile (e.g. RH tile), then this tile is considered as used (i.e. 100% usage). Otherwise, it is considered as free. In case of user requirements, these loads indicate that no task of the application uses more than respectively 25%, 50% and 75% of a certain resource. Placing a task on a single task tile will result in 100% usage.

Figures 36B, 36C:
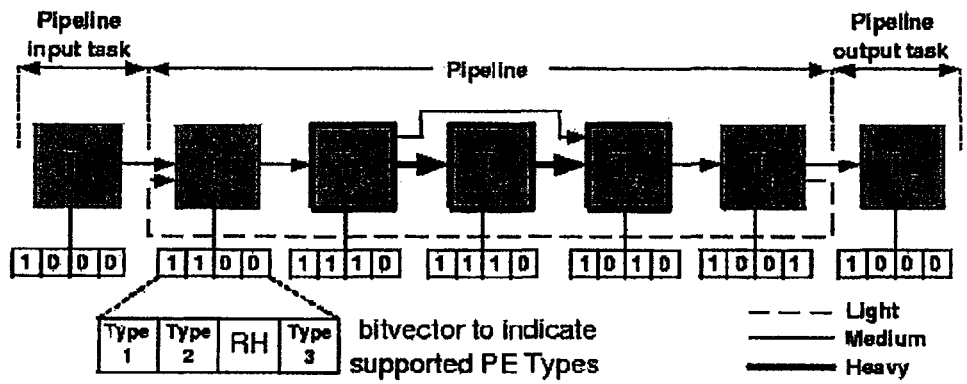
FIG. 36B is a table showing the success rate of the heuristic algorithm (with respect to searching the full mapping solution space) for LIGHT and MEDIUM loaded platforms and for varying application load.
FIG. 36C is a table showing the performance of the heuristic algorithm under various load conditions

FIG. 36B is a table illustrating the success rate of the heuristic (with respect to searching the full mapping solution space) for LIGHT and MEDIUM loaded platforms and for varying application load. The amount of backtracking steps allowed is indicated by the BT value. On the StrongARM processor (SA-1110), the heuristic requires on average 893 microsec (std. dev. 77 microsec) to reach a full mapping without backtracking. With backtracking (BT=3), the algorithm requires on average 1.13 ms (std. dev.358 microsec) to come to a conclusion (i.e. success or failure). Exploring the entire solution space requires about 378 ms. The experiment shows that, although backtracking clearly improves the success rate, the heuristic does not always find a suitable solution.

In the experiments leading to the results of the table of FIG. 36B all tasks with RH support (i.e. T3, T4 and T5) could be placed on any of the two RH tiles. However, when T4 and T5 only fit on tile 5, while T3 fits on both RH tiles, the mapping success rate drops from 53.67% to 44.73% in case of a MEDIUM loaded 3×3 NoC (application HEAVY, without backtracking). The mapping success drops even further down to 36.84% in the absence of the reconfigurable hardware add-ons concerned with area fragmentation and gain. This means the RH add-ons significantly improve the mapping performance in case of different RH tile sizes.

By looking at the hop-bandwidth product (i.e. the product of the number of assigned injection slots between two tasks and the hop-distance between them), it is possible to estimate the quality of the mapping. Indeed, heavily communicating tasks should be mapped close together in order to minimize communication interference]. FIG. 36C is a table showing that the heuristic algorithm performs well under various load conditions. The main reason for the very low minimum hop-bandwidth product of application LIGHT is due to the fact that all tasks with heavy communication can be placed on a single tile (e.g. all on the StrongARM PE). However, the heuristic tries to share the load among different PEs.

In contrast to the related work, a heuristic according to an embodiment of the present invention does not consider the co-scheduling issue nor the real-time constraints of individual tasks. This is mainly because currently most PEs can only accommodate a single task (i.e. no co-scheduling or real-time issue on these PEs).

Run-Time Task Migration

Whenever the user requirements change (e.g. switching to another resolution in a video decoding application) or in case of a mapping failure, the resource management heuristic can use run-time task migration to re-allocate resources. Run-time task migration can be defined as relocation of an executing task from the source tile to the destination tile. Applications targeted at this kind of system are typically composed of communicating tasks. Depending on the availability and suitability of the resources, tasks are mapped by an operating system onto the tiles. In order to react to varying run-time conditions, the operating system requires task migration capabilities, as seen in FIG. 17A Run-time task migration can be defined as the relocation of an executing task from its current location, the source tile, to a new location, the destination tile, as seen in FIG. 17B.

In order to overcome the architectural differences between heterogeneous PEs, tasks can only migrate at pre-defined execution points (further denoted as migration points) [P. Smith, N. Hutchinson, "Heterogeneous Process Migration: The Tui System", Univ. of British Columbia, 1996.]. A major issue in run-time task migration, besides capturing and translating task state, is assuring communication consistency during the migration process. This issue originates from the fact that, after receiving a migration request, the amount of time and input messages a task requires to reach its migration point is unknown. This means that the message producer tasks (i.e. the communication peers) have to keep sending messages until the migrating task signals that a migration point is reached and that it stopped consuming messages. However, at that time there might be a number of unprocessed messages buffered in the communication path between message producer tasks and the migrating task.

The run-time task migration topic has been studied extensively for multicomputer systems since the beginning of the 1980s. However, due to the very specific NoC properties (e.g. different communication protocols and a very limited amount of communication memory), the existing mechanisms are not directly applicable.

The message consistency mechanism described by Russ et al. [S. H. Russ, J. Robinson, M. Gleeson, J. Figueroa, "Dynamic Communication Mechanism Switching in Hector", Mississippi State University, September 1997.] collects all unprocessed messages into a special input queue when a migration point is reached. After the actual migration, all communication peers are notified and their task lookup table is updated to reflect the new location of the migrated task. Communication consistency is preserved by emptying the special input message queue before receiving any messages produced after completion of the migration process. This mechanism is not well-suited for a NoC: due to the very limited amount of message buffer space it is impossible to store all incoming messages after a task reached its migration point. Adding more buffer space is expensive and the maximum amount of required storage is very application dependent.

The message consistency mechanism of the Amoeba OS [C. Steketee, W. Zhu, P. Moseley, "Implementation of Process Migration in Amoeba.", Proc. of the 14th Conference on Distributed Computing Systems, pp 194-201, 1994.] drops the unprocessed messages (instead of queuing them) during task migration. The message producer is responsible for resending the message. After migration, any task that sends a message to the old location of the migrated task will receive a not here reply. This response triggers a mechanism to update the producer's task lookup table. A drawback of this technique is the loss of migration transparency (i.e. messages need to be resent to a new destination). In addition, dropping and re-transmitting packets reduces network performance, increases power dissipation and leads to out-of-order message delivery. Getting messages back in-order in a task-transparent way requires (costly) additional re-order functionality and buffer space.

NoC Management Case Study

In accordance with an aspect of the present invention two applications can concurrently share communication resources of the NoC. First of all, their communication is characterized by means of traffic statistics, gathered by the OS. Secondly, this section illustrates how the operating system can manage communication interference between the applications.

Video Decoder Application

The main application in this embodiment is a Motion-JPEG video decoder. It is composed of four tasks running concurrently on the computation resources of the platform, as seen in FIG. 6. Two of these tasks, the sender and the receiver, run in software on the processor of a slave node 610, e.g. a Strong-ARM processor. The two other tasks are hardware blocks: a task that performs the Huffman decoding and the dequantisation, further denoted as Huffman block 620, and a task that performs a 2D-IDCT and a YUV to RGB conversion, further denoted IDCT block 630. The sender task, running on node 610, sends an encoded video data-stream 640 to the Huffman block 620. The Huffman block sends the decoded data stream 650 to the IDCT block 630. The output 660 of the IDCT is sent back to the Strong-ARM 610 to be displayed by the receiver task.

Video Decoder Characterization

Figure 7:
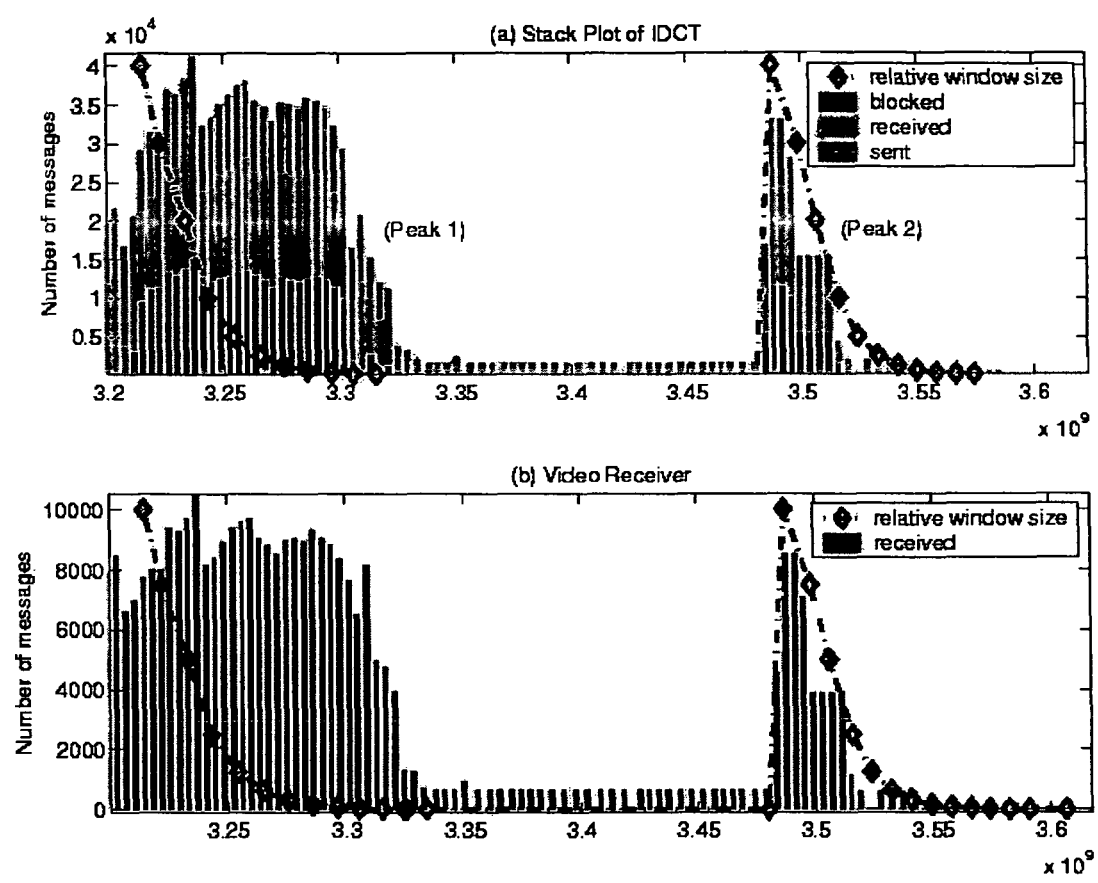
FIG. 7 shows communication characterization of receiver and IDCT block in the MJPEG video decoder according to an embodiment of the present invention. Time is given in OS ticks. Samples are taken every 20 ms.

The communication of the video decoder has been characterized by means of the message statistics captured by the OS, as seen in FIG. 7. These statistics include the number of messages sent, received and blocked. The send and receive tasks only have statistics for messages received and sent, because they are software tasks running on the central CPU. Their communications are accounted for directly by the core OS and not by a local control NIC for every task in the application. The core OS samples the relevant control NICs once every sample time period, e.g. 20 ms.

As an example, the same video sequence has been played twice with different windowing techniques. Peak(1) in FIGS. 7A and 7B has been obtained by applying a window spreading technique whereas the second peak, Peak (2), was obtained by allocating continuous blocks of bandwidth, as seen in FIG. 7A. In both cases the window size gradually decreases from (98.85 MB/s when clocked at 50 MHz) down to (approximately 25 KB/s).

The window spreading technique is clearly performs better: the throughput of the video decoder application only starts to decrease when the OS diminishes its effective window. For small windows sizes (i.e. when it is spread) the percentage of bandwidth actually allocated can be slightly bigger than the percentage of window allocated. This is due to the injection rate control mechanism that allows a message to be completely sent before closing the sending window. In this case the window is a prolonged for maximum one MTU to less than of the total bandwidth and reaches half of the throughput for a total allocated window of less than (about 1.5 MB/s). In the case of the non-spreading technique, half-throughput is reached as soon as the allocated bandwidth is less than. Adequate OS control of the communication can improve NoC performance by a significant factor, e.g. 50.

Characterization of the Perturbing Application

To evaluate the influence of communication interference between applications that compete for NoC resources, a synthetic application has been designed, as seen in FIG. 6. Its purpose is to load a certain communication channel in the NoC. This application is composed of a message generator 670, that produces traffic 680 at a constant rate, and a message sink 690, that consumes messages slower than they are produced by the message generator. The chosen production/consumption message ratio guarantees that the NoC router of the message sink reaches a saturation level and hence severely impacts other communication flows sharing the same channel.

The communication characteristics of this synthetic application, when using bandwidth spreading, are shown in FIG. 9C. As expected, the message sink blocks as many messages as it receives. It is only when the allocated bandwidth is decreased below that the blocking behavior stops.

OS Communication Management

Figure 8:
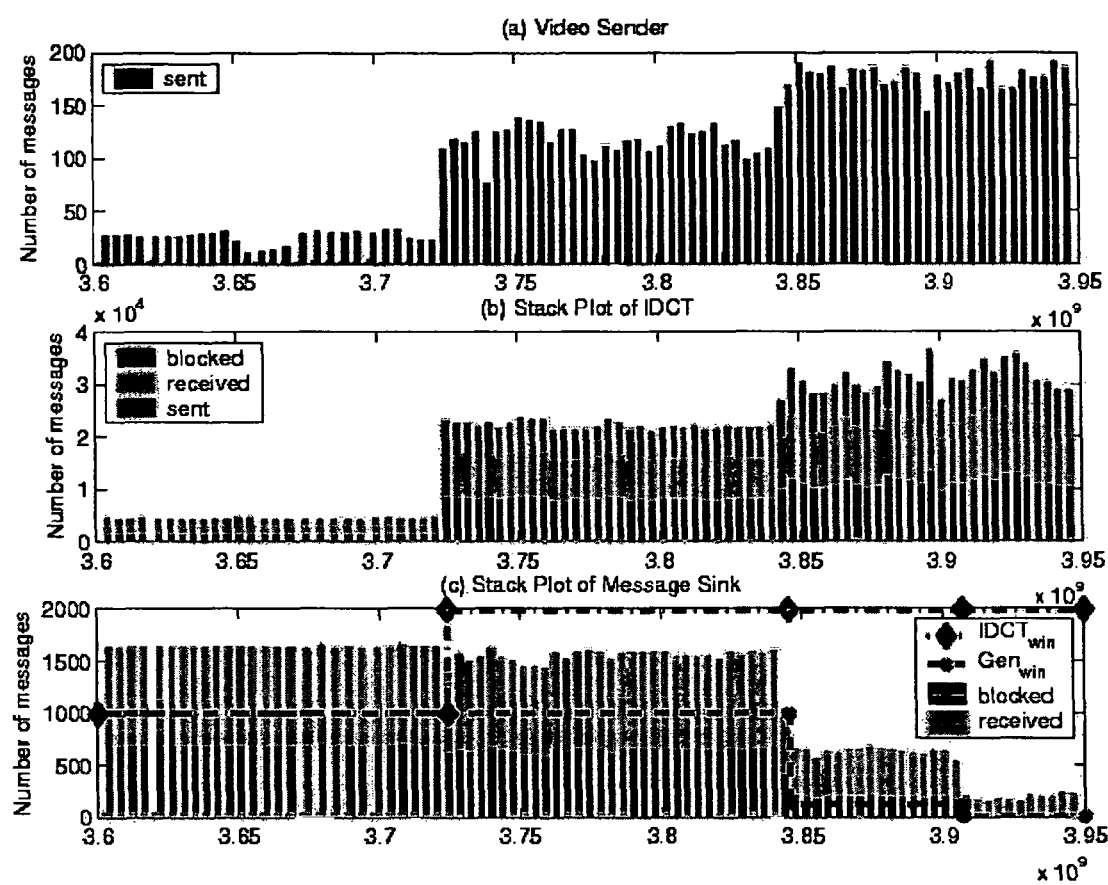
FIG. 8 shows influence of synthetic perturbation on channel 7→6 on video decoder performance. Bandwidth is allocated by continuous blocks.
Figure 9:
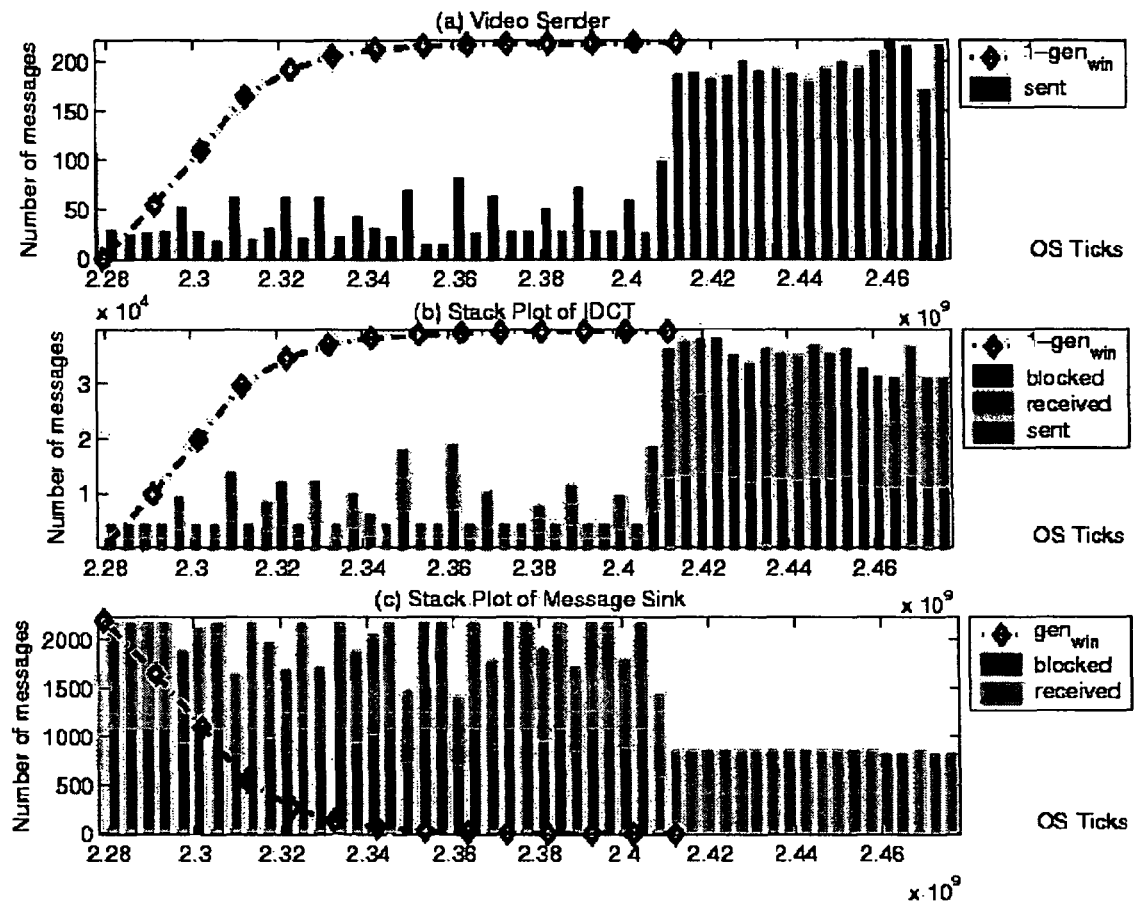
FIG. 9 shows influence of synthetic perturbation on channel 7→6 on video decoder performance. Sequence uses windows spreading mechanism.

After placing the video application tasks, the message generator and message sink from the perturbing application have been mapped on tiles 7 and 6 respectively as seen in FIG. 6. This way, the perturbing application will congest the communication channel between tiles 7 and 6 (referred to as 7→6) it shares with the video decoding application. Measurements have been performed for both bandwidth allocation techniques: window-spreading and using continuous (single block) windows. These measurements are illustrated in FIG. 9 and FIG. 8 respectively. The effect of diminishing window size is clear on the message sink task in the case of the continuous-window allocation: the amount of messages sent is directly proportional to the injection rate window set, as seen in FIG. 8C. Optimal Video Decoder performance is obtained when less than 1% of the total bandwidth is allocated to the message generator (FIG. 8C, time interval [3.91e9; 3.95e9]). The OS can perform a trade-off between performance of both applications by changing their respective injection rates.

When using the window-spreading technique, the effect of diminishing the total window size is not directly proportional to the bandwidth allocated and the trade-offs obtained in the previous case are not possible, as seen in FIG. 9C. However, using window spreading has other advantages: jitter is greatly reduced because communications are evenly spread over time. Moreover, a proper window setting can hide the latency of the receiver side and completely suppress blocking on the network. In FIG. 9C at the OS time-stamp 241e7, the message sink task no longer causes message blocking in the NoC. This happens when the window of the message generator is less than 0.02% of the total bandwidth.

Figure 10:
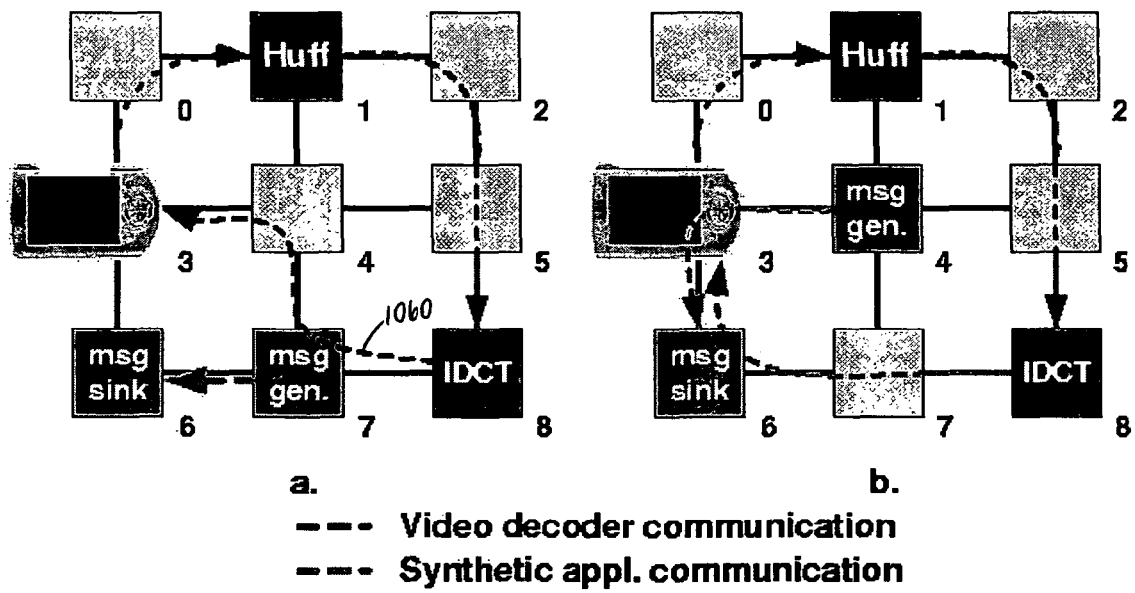
FIG. 10 shows that an operating system according to an embodiment of the present invention can solve the interference between applications by dynamically changing the routing table (a) or by migrating the message generator to a different tile (b).

Note that the message sink 690 is not disturbed by this window reduction: it still consumes 40000 messages per second. The OS has simply matched the window size to the optimal sending rate in the perturbing application. As a consequence, thanks to the bandwidth saved by the OS, the video decoder reaches its optimal frame-rate. Besides the injection rate control mechanism, the operating system can also solve interference issues between applications in other ways. First of all, it is possible to avoid the congested link by rerouting the video application stream 1060, as seen in FIG. 10A. In addition, the OS can decide to dynamically migrate the message generator task 670 to another node in the NoC, as seen in FIG. 10B.

Networks on Chip as Hardware Components of an OS for Reconfigurable Systems

In complex reconfigurable SoCs, the dynamism of applications requires an efficient management of the platform. To allow run-time allocation of resources, operating systems and reconfigurable SoC platforms should be developed together. The operating system requires hardware support from the platform to abstract the reconfigurable resources and to provide an efficient communication layer. The present invention provides interconnection networks which are used as hardware support for the operating system. Multiple networks interface to the reconfigurable resources, allowing dynamic task relocation and extend OS-control to the platform. An implementation of these networks in a digital logic element such as a programmable gate array, e.g. an FPGA, is described.

Adding reconfigurable hardware resources to an Instruction Set Processor (ISP) provides an interesting trade-off between flexibility and performance, e.g. in mobile terminals such as PDAs, mobile phones, smartphones, laptops, palmtops etc. Because these terminals are dynamic and run multiple applications, design-time task allocation is clearly not an option. Additional dynamism may arise from changing bandwidth availability in networked applications and from intra-application computation variation as in MPEG-4. Tasks must therefore be mapped at run-time on the resources. The present invention provides an operating system to handle the tasks and their communications in an efficient and fair way at run-time.

In addition to supporting all the functionality of traditional OSes for ISPs, an Operating System for Reconfigurable Systems (OS4RS) has to be extended to manage the available reconfigurable hardware resources. Hardware support for an OS targeting reconfigurable SoCs is required for two reasons.

On the one hand, inefficiencies inherent to software management of critical parts of the system, such as inter-task communication have to be avoided. On the other hand, the ISP needs physical extensions to access, in a unified way, the new functions of all components of a reconfigurable SoC. Interconnection networks are provided as hardware support for the operating system.

The present invention uses a system composed of an ISP running the software part of the OS4RS, connected to a digital logic element such as a FPGA containing a set of blocks, called tiles, that can be individually reconfigured to run a hardware task, also called an IP-block. The present invention is not restricted to FPGAs and can be applied to other reconfigurable SoC architectures as well.

Multiple NoCs are Required for OS4RS HW Support

Firstly requirements of an OS4RS in terms of hardware support will be described followed by how a single NoC enables partial support of an OS4RS and demonstrate dynamic multitasking on FPGAs. A proposal for complete OS4RS HW support is discussed further.

OS4RS Requirements in Terms of HW Support

In a heterogeneous reconfigurable platform, traditional tasks of operating systems are getting more complex. The following paragraphs enumerate typical functions of the OS and explains why hardware support is required when adding reconfigurable hardware computing elements to an ISP.

Task creation/deletion: This is clearly the role of an operating system. In addition to the traditional steps for task setup in an operating system, there is a need to partially configure the hardware and to put it in an initial state. OS access to the reconfiguration mechanism of the hardware is therefore required.

Dynamic heterogeneous task relocation: Heterogeneous task relocation is a problem that appears when dealing with the flexible heterogeneous systems that are targeted (ISP+ reconfigurable hardware). The problem is allowing the operating system to seamlessly migrate a task from hardware to software (or vice-versa) at run-time. HW to HW relocation may also be required to optimize platform resource allocation and keep communications local within an application. This involves the transfer of an internal state of the task (e.g. contents of internal registers and memories) from HW to SW (or vice-versa).

Inter-task communication: Inter-task communication is traditionally supported by the operating system. A straightforward solution would be to pass all communications (HW to HW as well as HW to SW) through the OS running on the ISP. On a heterogeneous system, this solution clearly lacks efficiency, since the ISP would spend most of its time copying data from one location to another. Hardware support for intra-task data transfers, under control of the OS, is a better solution.

Debug ability: Debugging is an important issue when working with hardware/software systems. In addition to normal SW debug, the operating system should provide support to debug hardware tasks. This support, in terms of clock stepping, exception generation and exception handling is local to the HW tile and cannot be implemented inside the ISP running the OS. Specific hardware support is thus required.

Observability: To keep track of the behavior of the hardware tasks, in terms of usage of communication resources and of security, the operating system requires access to various parts of the SoC. It is inefficient for the central ISP to monitor the usage of communication resources and check whether the IPs are not creating security problems by inappropriate usage of the platform. A hardware block that performs this tracking and provides the OS with communication statistics and signals security exceptions is therefore essential.

In the present invention NoCs can be used as hardware components of an operating system managing reconfigurable SoCs. To support advanced features, such as dynamic task relocation with state transfer, HW debugging and security, an operating system requires specific HW support from the platform. The present invention provides an architecture for reconfigurable SoCs composed of at least two NoCs interfaced to reconfigurable IPs. This approach gives a clean logical separation between the various types of communication: application data, OS control and reconfiguration bitstreams. Having multiple NoCs interfaced to reconfigurable IPs provides efficient HW support for an operating system for reconfigurable systems. They open the way to future reconfigurable SoC platforms, managed by operating systems that relocate tasks between HW and SW to dynamically optimize resource usage.

Single NoC Allows Dynamic Multitasking on FPGAs, but has Limitations

Separating communication from computation enables task creation/deletion by partial reconfiguration. The NoC solves inter-task communication by implementing a HW message-passing layer. It also partially solves the task relocation issue by allowing dynamic task migration thanks to run-time modification of the Destination Look-up Tables, located in the network interface component (NIC) This acronym overloads Network Interface Card because the NIC serves the similar role of abstracting a high-level processor from the low level communication of the network. These concepts have been implemented in the T-ReCS Gecko demonstrator.

Dynamic task relocation requires preemption of the task and the transfer of its state information (e.g. contents of its internal registers and memories) to the OS. This state information is then used to initialize the relocated task on a different computation resource (another HW tile or a software thread on the ISP) to smoothly continue the application.

To support general dynamic task relocation, a system according to the present invention allows the OS to synchronize communications within an application. An aspect of the present invention is to physically separate OS communication from application communications by means of separate NoCs and is discussed in the following section. This is in contrast to the proposal of Rijpkema, et al. Additional extensions are required to provide full HW support to the OS4RS. There is a need for mechanisms to retrieve/restore state information from a task, to control communication load, handle exceptions and provide security and debug support.

Reconfigurable Hardware Multitasking Requires Three Types of Communication

On the reconfigurable platform the FPGA executes a task per reconfigurable tile and is under the control of an operating system running on the ISP. The OS can create tasks both in hardware and software. For such as system there are two distinct types of communication: OS OAM data and application data. Furthermore, reconfigurable systems have a third logical communication channel to transmit the configuration bitstreams to the hardware tasks.

Each tile in a reconfigurable SoC according to this embodiment has therefore three types of communication: reconfiguration data, OS OAM data and application data.

Because application data requires high bandwidth whereas OS OAM data needs low latency, each communication type is implemented on a separate network to efficiently interface the tiles to the OS running on the ISP. FIG. 11 shows a reconfigurable SoC having a reconfiguration network 1110, a data network 1120 and a control network 1130. The services implemented on these three networks compose the HW support for the OS4RS.

In addition to efficiency, a clean logical separation of the three types of communications in three communication paths ensures independence of application and OS. The OS does not need to care about the contents of the messages carried on the data network and an application designer does not need to take into account OS OAM interactions.

Implementation of a Novel NoCs Architecture Providing HW Support to an OS4RS

In accordance with an aspect of the present invention the NoCs play their role as HW support for an OS4RS.

Application Data Network

By application data is meant the data transferred from one task to another inside an application. Tasks communicate through message passing. These messages are sent through the Data Network (DN) if the sender and/or the receiver are in a HW tile. A similar message passing mechanism is used for two software tasks residing in the ISP. For performance reasons, application data circulates on the NoC independently of the OS. Nevertheless, the DN must provide hooks for the OS to enable platform management. These hooks, detailed in the next subsections, are implemented in the NIC of the DN and compose a part of the HW support for OS4RS.

Data NIC Supports Dynamic Task Relocation

Inter-task communication is done on an input/output port basis. FIG. 12 shows an example of an application task graph 1200 with the input/output port connections between tasks. Each application registers its task graph with the OS upon initialization. For each task 1210 in the application, the OS assigns a system-wide unique logic address and places the task on the platform, which determines its physical address, as seen in FIG. 13. For every output port 1220 of a task the OS defines a triplet, e.g. destination input port, destination logic address, destination physical address. For instance, task C in FIG. 12 has two output ports, hence is assigned two triplets, which compose its Destination Look-Up Table (DLT) 1310, as seen in FIG. 13. In a system according to an embodiment of the present invention a task may have up to 16 output ports, thus there are 16 entries in that task's DLT. The OS can change the DLT at run-time, by sending an OAM message on the Control Network (CN). Dynamic task relocation in reconfigurable SoCs is enabled by storing a DLT in the data NIC of every tile in the system.

Data NIC Monitors Communication Resources

The usage of communication resources on the DN is monitored in the data NIC of every tile. Relevant figures such as number of messages coming in and out of a specific tile are gathered in the NIC in real time and made available to the OS. Another important figure available is the average number of messages that have been blocked due to lack of buffer space in the NIC. These figures allow the OS to keep track of the communication usage on the NoC. Based on these figures and on application priorities, the OS4RS can manage communication resources per tile and thus ensure Quality of Service (QoS) on the platform.

Data NIC Implements Communication Load Control

The maximum amount of messages an IP is allowed to send on the network per unit of time can be controlled by the OS. To this end the present invention provides an injection rate controller in the data NIC. Outgoing messages from an IP are first buffered in the NIC and are then injected in the network as soon as it is free (e.g. a Best Effort service). The injection rate controller adds an extra constraint on the time period when the messages may be injected in the NoC. It is composed, for example, of a counter and a comparator. The OS allows the NIC to inject messages only during a window of the counter time. The smaller the window, the less messages injected into the NoC per unit of time, freeing resources for other communications. This simple system introduces a guarantee on average bandwidth. As long as the data NIC buffers are not permanently saturated usage of load control in the NoC allows the OS to manage QoS on the platform.

Data NIC Adds HW Support for OS Security

Security is a serious matter for future reconfigurable SoCs. Thanks to reconfiguration, unknown tasks may be scheduled on HW resources and will use the DN to communicate. Sanity checks are performed on the messages circulating on the DN and the OS is notified when problems occur. Communication related checks are naturally performed in the NIC. Whether the message length is smaller than the maximum transfer unit is checked, and also that messages are delivered in order and especially that IPs do not breach security by sending messages on output ports not configured in the DLT by the OS.

Control Network

With respect to FIG. 11, the control network 1130 (CN) is used by the operating system to control the behavior of the complete system. It allows data monitoring, debugging, control of the IP block, exception handling, etc. OS OAM messages are short, but must be delivered fast. A low bandwidth, low latency CN is provided.

CN Uses Message-Based Communication

To limit resource usage and minimize latency the CN can be implemented as a shared bus, where the OS running on the ISP is the only master and all control network NICs of tiles are slaves. The communication on this bus is message-based and can therefore be replaced by any type of NoC. The control NIC of every tile is memory-mapped in the ISP. One half of this memory is reserved for ISP to control-NIC communication and the other one for NIC to ISP communication. To send a control OAM message to a tile, the OS first writes the payload data, such as the contents of a DLT, exemplary contents of which can be seen in FIG. 13, and finishes by writing a command code on the CN, in this case UPDATEDLT. The control NIC reads the command opcode and processes it. When done, it writes a status opcode in the NIC to NoC memory, to indicate whether the command was successfully processed and posts an interrupt. The OS retrieves this data and clears the interrupt to acknowledge the end of command processing.

In an embodiment of the invention, a run-time traffic management method is provided with specific support for reconfigurable hardware tiles. In a further embodiment a run-time traffic management method is provided especially suited for platforms with limited communication memory and using a simple communication protocol. A feature of the run-time traffic management method exploits an interrupt based mechanism instead of the conventional polling based mechanisms, in order to reduce the resource requirements. During most of the communication, the send window values are kept constant by the OS. Hence, instead of the OS polling for NoC traffic conditions, the invention uses an approach wherein a control NIC can invoke the OS intervention when it finds unacceptable traffic conditions on the data NoC.

This NoC traffic rate control mechanism acts on the level of the Network Interface Component, instead of on the computing resources level as disclosed in Kumar et al. [S. Kumar, A. Jantsch, M. Millberg, J. berg, J. Soininen, M. Forsell, K. Tiensyrj, and A. Hemani, "A network on chip architecture and design methodology," in Proceedings, IEEE Computer Society Annual Symposium on VLSI, April 2002.]

CN Controls the DN

The data NIC provides control capabilities to the OS in order to control the communication circulating on the DN. The OS commands, to enforce load control or synchronize DN communication, are actually sent over the CN to avoid interference with application data. It is in the control NIC, that statistics and security exceptions from the data NIC are processed and communicated to the OS. It is also through the CN that the OS sends destination look-up tables or injection-rate windows to the data NIC.

CN Implements HW OS Support to Control IPs

Another very important role of the CN is to allow control and monitoring of the IP running on a reconfigurable tile, described with respect to FIG. 14. To clearly understand the need for OS control here, let us consider the life cycle of a reconfigurable IP block 1410 in a SoC platform of the present invention. Before instantiating the IP block in a tile by partial reconfiguration, there is a need to isolate the tile from the communication resources, to ensure the IP does not do anything harmful on the DN before being initialized. To this end, the control NIC 1420 implements a reset signal and bit masks to disable IP communication. After reconfiguration, the IP needs to be clocked. However, its maximum clock speed might be less than that of the DN. As constraining the speed of the platform to the clock speed of the slowest IP (which can always change as new IP-blocks are modified at run-time) would be a disadvantage, the OS can preferably set a clock multiplexer to feed the IP with an appropriate clock rate.

The IP can now perform its computation task. At some stage it might generate an exception, to signal for instance a division by zero. Still with respect to FIG. 14, the control NIC 1420 implements a mechanism to signal IP exceptions to the OS. The OS can also send exceptions to an IP, as it can send signals to processes running on the ISP. One usage of these exceptions is to perform IP debugging. Later on, the OS might decide to relocate the IP to another HW tile or as a process on the ISP. The NIC implements a mechanism to signal task switching to the IP and to transmit its internal state information to the OS. The NIC also implements a mechanism to initiate an IP with a certain internal state, for instance when switching from SW to HW.

Reconfiguration Network

A reconfigurable SoC according to an embodiment of the present invention targets a Xilinx VIRTEX-2 PRO as an implementation platform. IPs are instantiated on tiles by partially reconfiguring the chip. In this case, the reconfiguration network is already present on the platform as the native reconfiguration bus of the VII-Pro. The reconfiguration bus is accessed through the internal reconfiguration access port (ICAP) and is based on the technology presented by Blodget et al. The main difference resides in the fact that the platform is driving the ICAP through the OS4RS, running on a PowerPC, instead of a dedicated soft core like the MicroBlaze.

Implementation Results

Results of an enhanced HW support of an OS4RS in accordance with an embodiment of the present invention, in terms of latencies induced by HW OS processing time and in terms of area overhead are now discussed.

HW OS Reaction Time

The SW part of the OS4RS is running on an ISP and controls the HW OS extensions located in the data and control NICs, through the control network. FIG. 15 shows the processing in SW 1510 and HW 1520, when the OS4RS resets a reconfigurable IP block running on a HW tile. It is assumed that the control NIC is clocked at 22 MHz and that the ISP can access the 16-bit wide control network at 50 MHz. The SW part of the OS4RS sends the atomic RSTIP command to the control NIC of the IP in 120 ns. A total of 12.8 μs is spent in the control NIC to decode, process and acknowledge the commands issued from the SW part of the OS. Only 320 ns are spent by the SW OS to send an atomic instruction and request the control NIC to clear the IRQ, acknowledging the command has been processed. The total processing time is under 13.2 μs In the case of dynamic task relocation from SW to HW, the reconfigurable IP needs to be initialized with the state information extracted from the SW version of the task. Assuming there are 100 16-bits words of state information to transfer, the total transaction takes about 440 μs (control NIC transmits a word to the IP in 4.3 μs).

In both cases the control NIC abstracts the access to the reconfigurable IP block from the SW part of the OS4RS. Because the NICs offload the ISP from low-level access to the reconfigurable IP blocks, they are considered as the HW part of the OS4RS.

HW OS Implementation Size

In one embodiment the fixed NoCs are implemented together with the reconfigurable IPs on the same FPGA. FIG. 26B is a table showing the area usage of the NoCs in terms of FPGA logic and one can consider it as overhead to the reconfigurable IPs they support.

The support of functions required by a full OS4RS such as state transfer, exception handling, HW debugging or communication load control come at the expense of a higher area overhead in the NIC. On the target platform, the Virtex-II Pro 20, this area overhead amounts to 611 slices, or 6.58 percent of the chip per reconfigurable tile instantiated. Nevertheless on a production reconfigurable SoC, the NoCs could be implemented as hard cores, reducing considerably the area overhead on the chip.

Task Migration in a Network-on-Chip

A task migration mechanism is responsible for performing the actual task relocation according to the decisions made by the migration policy. One of the essential issues the task migration mechanism has to ensure is the efficient management of the continuing communication between the migrating task and the other tasks of the application. This implies that the migration mechanism needs to guarantee communication consistency by transparently redirecting messages during the task migration process. This means that once a message has been sent, it should reach its destination task without the need for resending it from the sender task, even when the receiving task is migrating to a different tile. With respect to FIG. 18, it is generally unknown when a migrating task $T_3$ will reach a preemption point. When it does, there might be a number of unprocessed messages 1810 as well as a number of messages 1820 buffered in the communication path between the migrating task 1830 and its communication peers 1840. Obviously, these messages need to be transferred to the new location of the migrating task at minimal cost. In addition, the communication peers 1840 ($T_1$ and $T_2$) somehow need to be informed of $T_3$'s new location 1850.

In accordance with an aspect of the present invention a task migration mechanism ensures Message Consistency in a Network-on-Chip, and this is demonstrated with two task migration mechanisms. The first approach provides message consistency in a task-transparent way, assuming an extremely limited amount of message buffer space per tile. The second mechanism is based on In-order message delivery without additional message re-order functionality. No messages are dropped and/or retransmitted. The first mechanism is generally applicable, while the second one makes some assumptions on the algorithm.

The different steps that need to be performed by the first more general NoC migration mechanism to actually migrate a task are described in detail in FIG. 19. When the operating system 1910 sends a switch signal 1920 to the origin tile (point 1 in the process, as labeled in FIG. 19), the task running on that tile may be in a state that requires more input data before it is able to reach a migration point. This input data originates from other tasks called sender tasks instantiated on tiles denoted as sender tiles 1930. Neither the OS, nor the sender tasks know how many input messages are required for the task on the origin tile to reach a migration point. When the task on the origin tile reaches its migration point, it signals this event to the operating system (points 1 to 2). In turn, the operating system instructs the sender tasks to send one last tagged message to the origin tile and then stop sending further messages (point 2). The operating system then sets up, initializes and starts the migrating task on the destination tile 1940 (point 3). The next step is to forward all buffered and unprocessed messages to the new location of the migrated task. To this end, the operating system initializes a new DLT (the so-called forward-DLT) on the origin tile and instructs to orderly forward all incoming messages (point 4). This forwarding process is also shown in FIG. 20. In order to avoid having to resolve the location of a communication peer every time a message is sent, every processing element maintains a destination lookup table (DLT). The destination tile informs the operating system whenever a tagged message is received. In that event, the operating system updates the DLT of the sender tile to reflect the new location of the migrated task and the sender tile can resume sending messages (point 5). The arrival of all tagged messages in the destination tile indicates the end of the migration process. Hence the OS can free the origin tile (point 6).

A second less general invented migration mechanism is denoted the pipeline migration mechanism and is based on the assumption that most multimedia algorithms are pipelined (e.g. 3D, MP3 decoding, image/video decompression, etc.). The different pipeline components execute in parallel on different processing elements in the tile-based system. FIG. 21 illustrates the MPEG-4 simple-profile decoding pipeline presented in [K. Denolf, P. Vos, J. Bormans, I. Bolsens, "Cost-efficient C-Level Design of an MPEG-4 Video Decoder", International Workshop on Power and Timing Modeling, Optimization and Simulation, Sep. 13-15, 2000, Goettingen, Germany.]. Most of these multimedia algorithms have stateless points. This means that at certain points in time, new and independent information is put into the pipeline, as illustrated in FIG. 22. For example, an MPEG pipeline periodically receives an I-frame 2210 to decode. This I-frame does not depend, in any way, on previously processed information. Hence, this I-frame could be decoded by a newly instantiated MPEG decoding pipeline. Based on these assumptions, a migration mechanism to move an entire pipeline at once can be created. The different steps of such a mechanism are detailed by FIG. 23.

In this case the operating system 2310 instructs the pipeline source task 2320 (the mechanics of an exemplary pipeline task are shown in FIG. 21) to continue feeding data into the pipeline until a stateless point is reached. At that point, the pipeline source task should issue a pipeline flush by sending a special message through the pipeline 2340 or to the pipeline sink task 2330 (point 1 in the process, as labeled in FIG. 23). As soon as the pipeline is flushed, the pipeline sink task notifies the operating system (points 1 to 2). In contrast to the general task migration mechanism, there are no unprocessed or buffered messages in the path between pipeline source and pipeline sink. At this time, the OS can re-instantiate every task of the pipeline in a different location (point 2). This includes updating the DLT's of every new task. The only thing that remains before resuming normal operation is updating the DLT of the pipeline source task to reflect the new location 2350 of the first task in the pipeline (point 3). Finally, the operating system frees the resources occupied by the origin pipeline 2340.

Migration Mechanism Benchmarking

This section will analyze the performance of the presented migration mechanisms with respect to the benchmark properties discussed previously.

Minimal reaction time.
In case of the general migration mechanism, the reaction time (time between the OS migration request and the task actually reaching the migration point) will depend on the amount of migration points implemented within that task, while for the pipeline migration mechanism, it will depend on the time required to reach a stateless pipeline migration point and the time required to empty the pipeline.

Minimal freeze time.
Consider a pipeline containing T tasks and C communication channels. When using the general migration mechanism, the minimal (e.g. task state initialization is not considered) total freeze time is given by:

$$C \cdot t_{comm\_sync\_cmd} + T \cdot (t_{task\_setup} + t_{new\_dlt} + t_{fwd\_dlt} + t_{fwd\_cmd})$$

In case of the pipeline migration mechanism, the freeze time is given by:

$$T \cdot (t_{task\_setup} + t_{new\_dlt}) + t_{update\_sender\_dlt} + t_{release\_cmd}$$

Minimal residual dependencies.
The pipeline migration mechanism does not have any residual dependencies as shown by FIG. 23. The residual dependencies of the general migration mechanism, illustrated by FIG. 23, are given by:

$$C \cdot (t_{ack\_tag} + t_{update\_sender\_dlt} + t_{release\_cmd}) + t_{message\_fwd\_latency}$$

The time needed to forward all messages ($t_{message\_fwd\_latency}$) depends significantly on the circumstances in the network (e.g. hop-distance, blocking conditions, etc.).

Minimal system interference.
Moving a pipeline at once potentially reduces system interference in contrast to moving the pipeline task one by one. Consider an example pipeline, illustrated by FIG. 25. Some of the tasks 2510 have high inter-task communication, as illustrated by thick arrows 2520. Hence, they are mapped on adjacent tiles, as shown in FIG. 25B, to minimize network resource usage as well as the interference with other applications. FIG. 25C illustrates what happens if the application is relocated one task at a time, starting by task E. This approach would result (for a certain amount of time) in increased usage of NoC communication resources. In some cases, it might even interfere with communication of other applications. In this specific case, due to the fact that task E is located in a feedback loop, the performance of the application could deteriorate due to the increased latency of messages traveling between task C/task E and between task E/task B.

Maximum scalability.
When it comes to migrating a pipeline, using the pipeline migration mechanism is significantly more scaleable than the general migration mechanism, as illustrated in FIG. 24.

If the required PE resources are available upfront, setting up the new pipeline could be performed during the reaction time. In that case the freeze time would be independent of the amount of migrating pipeline tasks. Once a migrated task has started executing on its new tile, it should no longer depend in any way on its previous tile. This is denoted as residual dependencies. The residual dependencies are undesirable because they waste both communication and computing resources. The pipeline migration mechanism has no residual dependencies. The residual dependencies of the general migration mechanism shown in FIG. 25 are caused by acknowledging the arrival of tagged messages, updating the producer DLT(s) before instructing every producer to resume sending messages. The time required to forward the unprocessed messages heavily depends on the NoC conditions (e.g. congestion, etc.). In short, the pipeline migration mechanism is useful when simultaneously moving a set of tasks (e.g. due to changed user requirements). Otherwise, when moving a single task in order to, for example, resolve a mapping issue, the general migration mechanism is more appropriate (mainly due to the prolonged reaction time of the pipeline migration mechanism). Both mechanisms require the application designer to explicitly introduce migration points.

The migration mechanism needs the ability to capture and transfer the state of the migrating task in order to seamlessly continue execution once the task has been set up on the destination tile. In a heterogeneous environment the task state needs to be captured in a tile/processor independent way in order to mask the differences in task state representation between the origin tile and the destination tile. The principle of capturing and transferring task state during the relocation process is depicted by FIG. 26A. In order to relocate a task, the operating system can send a switch signal to that task, at any time (point 1, as labeled in FIG. 26A). Whenever that signaled task reaches a migration point it checks if there is a pending switch request. In case of such a request, the task goes into an interrupted state (point 2). In this state, all the relevant state information of that migration point is transferred to the operating system (point 3). Consequently, the OS will instantiate that task onto a different computing resource. The task will be initialized using the state information previously stored by the operating system (point 4). The tasks resumes by continuing execution in the corresponding migration point (point 5).

A further embodiment of the present invention provides an implementation of switching points that uses the Instruction Address Compare registers (IAC registers, i.e. the debug registers) present in most modern microprocessors. With this technique, the application registers the preemption points with the operating system. The operating system maintains the addresses of these preemption points in a task specific data structure within the operating system. Whenever the scheduler switches execution to a certain task, the IAC registers are updated with the respective addresses of the preemption points. During normal execution (i.e. in the absence of a switch request), there is no run-time overhead. When the operating system decides to migrate the task, it activates/enables the TAC registers. Consequently, when the task executes an instruction on such a registered address (i.e. when the task reaches a preemption point), a hardware interrupt will be generated. The respective interrupt handler will activate the mechanisms to capture the complete state of the preempted task. The main benefits of this technique are that detection is done in hardware and that it does not require any code modification, insertion of additional instructions into the task code. In addition, it uses mechanisms (in hardware/software) that are currently commercially available. The main drawback of this technique is the limited number of IAC registers, which could result in a limited number of migration points per task. In addition, there is a potential conflict with other tools using the same registers (e.g. debuggers).

What is claimed is:

1. A system having computation resources and an on-chip communications network that interconnects said computation resources of said system, at least part of said computation resources comprising a processor, said system running an application and an operating system, said on-chip communications network comprising:
    a first on-chip data traffic network, interconnecting said computation resources, handling communication of the application data between said computation resources;
    a second on-chip control traffic network, separate from the data traffic network, interconnecting said computation resources, handling operation and management communications between said computation resources by the operating system, said first and second on-chip networks being physically separated; and
    a management resource that in at least one operation mode runs an operating system for said arrangement, at least part of said computation resources and said management resource being located on a same chip or on a single die, wherein at least part of said computation resources and said management resource are connected by the first on-chip data traffic network and the second on-chip control traffic network, wherein to each of said computation resources a communication resource is assigned, said communication resource including a control network interface component, providing information to said operating system via said second on-chip control traffic network, wherein said control network interface component sets and enforces an injection rate control mechanism on said data network interface component, under supervision of said operating system.

2. The system according to claim 1, comprising a third on-chip configuration or programming network.

3. The system according to claim 2, wherein said on-chip configuration or programming network carries configuration or programming information, for at least one of said computation resources.

4. The system of claim 1, wherein said on-chip communication network is a packet-switched network.

5. The system of claim 4, wherein said control network interface enables said operating system to monitor data traffic at each of said computation resources.

6. The system of claim 1, wherein at least one of the data or control networks is arranged in bi-directional mesh.

7. The system of claim 1, wherein said communication resource further includes a control router for on-chip communications.

8. The system of claim 1, wherein to each of said computation resources a communication resource is assigned, said communication resource including a data network interface component for buffering data incoming from or outgoing to said first on-chip data traffic network.

9. The system of claim 8, wherein said data network interface component collects message or packet statistics of the computation resource to which it is assigned.

10. The system of claim 8, wherein said communication resource further includes a data router for on-chip communications.

11. The system of claim 10, wherein said data network interface enables said operating system to dynamically set the routing table in said data router.

12. The system of claim 1, wherein said control network interface component collects said information from said data network interface component.

13. The system of claim 1, wherein said control network interface component comprises a programmable microcontroller.

14. The system of claim 13, wherein said operating system is capable of modifying an instruction memory of said microcontroller.

15. The system of claim 1, wherein said management resource is a programmable processor/instruction set processor.

16. The system of claim 1, wherein said control network interface component, has operating system support actions in a master-slave arrangement with said management resource as master.

17. The system of claim 16, wherein said operating system support actions are invoked by said operating system via means for making an operating system function call on said control network interface.

18. The system of claim 1, wherein the operating system is arranged to perform distributed traffic management with global supervision.

19. The system of claim 1, wherein said operating system is adapted for providing network traffic management with statistical QoS.

20. The system of claim 1, wherein at least part of said computation resources are programmable processors.

21. The system of claim 1, wherein at least part of said computation resources are hardware reconfigurable.

22. The system of claim 1, wherein at least part of said data and control networks is implemented on reconfigurable hardware.

23. The system of claim 22, wherein said reconfigurable hardware is a FPGA.

24. A method for run-time network data traffic management on an system as defined in claim 1, comprising said control network interface invoking an intervention from said operating system.

25. A method for run-time network data traffic management on an system as defined in claim 1, comprising: said operating system determining send windows assigned per task based on output characterization information for each of said tasks, and at least one of said network interfaces providing said output characterization information to said operating system.

26. A system having computation resources and an on-chip communications network that interconnects said computation resources of said system, at least part of said computation resources comprising a processor, said system running an application and an operating system, said on-chip communications network comprising:
    a first on-chip data traffic network, interconnecting said computation resources, handling communication of the application data between said computation resources;
    a second on-chip control traffic network, separate from the data traffic network, interconnecting said computation resources, handling operation and management communications between said computation resources by the operating system, said first and second on-chip networks being physically separated; and a management resource that in at least one operation mode runs an operating system for said arrangement, at least part of said computation resources and said management resource being located on a same chip or on a single die, wherein at least part of said computation resources and said management resource are connected by the first on-chip data traffic network and the second on-chip control traffic network, wherein to each of said computation resources a communication resource is assigned, said communication resource including a control network interface component, providing information to said operating system via said second on-chip control traffic network, wherein said control network interface component performs local network traffic management by limiting the amount of packets that the corresponding computation resource for the control network interface are allowed to inject into said first on-chip data traffic network under supervision of said operating system.

* * * * *